United States Patent
Spahn et al.

(10) Patent No.: US 11,826,985 B2
(45) Date of Patent: Nov. 28, 2023

(54) SYSTEMS AND METHODS FOR LAMINATING CAN END STOCK

(71) Applicant: Novelis Inc., Atlanta, GA (US)

(72) Inventors: Peter Spahn, Göttingen (DE); Christian Tussing, Göttingen (DE); Michael Heinemann, Vellmar (DE); Dhiren Bhupatlal Ruparelia, Göttingen (DE); Joerg Hoehne, Göttingen (DE)

(73) Assignee: Novelis Inc., Atlanta, GA (US)

(*) Notice: Subject to any disclaimer, the term of this patent is extended or adjusted under 35 U.S.C. 154(b) by 396 days.

(21) Appl. No.: 16/723,024

(22) Filed: Dec. 20, 2019

(65) Prior Publication Data

US 2020/0207063 A1 Jul. 2, 2020

Related U.S. Application Data

(60) Provisional application No. 62/787,582, filed on Jan. 2, 2019.

(51) Int. Cl.
*B32B 15/20* (2006.01)
*B05D 1/02* (2006.01)
(Continued)

(52) U.S. Cl.
CPC ............ *B32B 15/20* (2013.01); *B05D 1/02* (2013.01); *B05D 1/18* (2013.01); *B05D 1/28* (2013.01); *B32B 15/088* (2013.01); *B32B 15/09* (2013.01); *C23C 22/07* (2013.01); *C23C 22/78* (2013.01); *B05D 3/002* (2013.01); *B05D 3/102* (2013.01);
(Continued)

(58) Field of Classification Search
None
See application file for complete search history.

(56) References Cited

U.S. PATENT DOCUMENTS 5,052,421 A * 10/1991 McMillen .............. C23G 1/125
134/28
5,059,258 A * 10/1991 Wefers .................... C23C 22/66
148/272

(Continued)

FOREIGN PATENT DOCUMENTS

CA 2374539 11/2000
CN 1112877 A 12/1995

(Continued)

OTHER PUBLICATIONS

Canadian Application No. 3,124,972, Office Action, dated Mar. 23, 2022, 4 pages.

(Continued)

*Primary Examiner* — Vivian Chen
(74) *Attorney, Agent, or Firm* — Kilpatrick Townsend & Stockton LLP

(57) ABSTRACT

Improved aluminum can end stock (CES) is disclosed. The CES includes an adhered polymer coating exhibiting low feathering and high performance in various acid tests. The low feathering and resistance to acid tests is accomplished by incorporating a copolymer adhesion promoter film to an aluminum alloy before lamination. In some cases, the metal strip is pretreated with a conversion layer, which can include compounds of trivalent chromium (Cr(III)) and phosphates or titanium and zirconium.

15 Claims, 9 Drawing Sheets

(51) Int. Cl.
B05D 1/18 (2006.01)
B05D 1/28 (2006.01)
B32B 15/088 (2006.01)
B32B 15/09 (2006.01)
C23C 22/07 (2006.01)
C23C 22/78 (2006.01)
B32B 37/12 (2006.01)
B32B 7/12 (2006.01)
B32B 38/16 (2006.01)
B32B 27/36 (2006.01)
B32B 38/00 (2006.01)
B05D 3/10 (2006.01)
B05D 3/00 (2006.01)
C23C 22/05 (2006.01)

(52) U.S. Cl.
CPC .......... B05D 3/108 (2013.01); B05D 2202/25 (2013.01); B05D 2350/00 (2013.01); B05D 2350/10 (2013.01); B05D 2350/65 (2013.01); B05D 2401/20 (2013.01); B05D 2502/00 (2013.01); B32B 7/12 (2013.01); B32B 27/36 (2013.01); B32B 37/12 (2013.01); B32B 38/162 (2013.01); B32B 2037/1253 (2013.01); B32B 2037/1276 (2013.01); B32B 2038/0048 (2013.01); B32B 2255/06 (2013.01); B32B 2255/26 (2013.01); B32B 2439/66 (2013.01); C23C 22/05 (2013.01)

(56) References Cited

U.S. PATENT DOCUMENTS

| | | | |
|---|---|---|---|
| 5,103,550 A * | 4/1992 | Wefers | C23C 22/73 413/18 |
| 5,463,804 A | 11/1995 | McCleary et al. | |
| 6,020,030 A * | 2/2000 | Guthrie | B05D 7/16 210/681 |
| 6,030,710 A | 2/2000 | Nitowski et al. | |
| 6,167,609 B1 * | 1/2001 | Marinelli | C23G 1/12 29/527.2 |
| 6,689,831 B1 * | 2/2004 | McMillen | C09D 5/084 524/413 |
| 6,696,106 B1 * | 2/2004 | Schultz | B05D 3/0254 427/508 |
| 8,808,844 B2 | 8/2014 | Niederst et al. | |
| 2009/0047524 A1 * | 2/2009 | Yaoi | B32B 27/36 428/458 |
| 2010/0243108 A1 * | 9/2010 | Karabin | C23C 22/78 205/188 |
| 2014/0072742 A1 * | 3/2014 | Penning | B29C 48/05 428/35.8 |
| 2015/0231859 A1 * | 8/2015 | Tatsumi | C22F 1/00 428/446 |
| 2017/0326862 A1 * | 11/2017 | Spahn | B32B 38/0036 |
| 2019/0091969 A1 * | 3/2019 | Penning | B32B 27/34 |
| 2019/0368068 A1 * | 12/2019 | Unal | C23C 22/00 |
| 2022/0275507 A1 * | 9/2022 | Beck | C23C 16/455 |

FOREIGN PATENT DOCUMENTS

| | | | | |
|---|---|---|---|---|
| CN | 1367720 | A | 9/2002 | |
| CN | 103596755 | A | 2/2014 | |
| CN | 107073873 | A | 8/2017 | |
| DE | 102005025083 | A1 | 12/2006 | |
| EP | 0312304 | | 3/1993 | |
| EP | 1239976 | B1 * | 8/2003 | ............... B05D 7/16 |
| EP | 1019248 | B1 | 2/2005 | |
| EP | 1715001 | | 10/2006 | |
| JP | 2003513773 | A | 4/2003 | |
| JP | 2003517929 | A | 6/2003 | |
| JP | 2012158383 | A | 8/2012 | |
| JP | 2015003450 | A | 1/2015 | |
| JP | 2015163731 | A | 9/2015 | |
| JP | 2017140713 | A | 8/2017 | |
| JP | 2018513280 | A | 5/2018 | |
| JP | 2019517937 | A | 6/2019 | |
| KR | 20140027992 | A | 3/2014 | |
| KR | 20180134879 | A | 12/2018 | |
| WO | 0132955 | A1 | 5/2001 | |
| WO | 0145866 | | 6/2001 | |
| WO | 2007102596 | A1 | 9/2007 | |
| WO | 2017138230 | A1 | 8/2017 | |
| WO | 2017196664 | | 11/2017 | |
| WO | 2018025057 | | 2/2018 | |

OTHER PUBLICATIONS

British Standard, "Paints and varnishes—Cross-cut test", The European Standard EN ISO 2409:2007, published Jun. 2007.
Maege et al., "Self-assembling adhesion promoters for corrosion resistant metal polymerinterfaces", Progress in Organic Coatings 34, 1-12, 1998.
International Application No. PCT/US2019/067810, International Preliminary Report on Patentability, dated Jul. 15, 2021, 8 pages.
International Application No. PCT/US2019/067810, International Search Report and Written Opinion, dated Jun. 24, 2020, 14 pages.
International Application No. PCT/US2019/067810, Invitation to Pay Additional Fees and, Where Applicable, Protest Fee, dated Apr. 30, 2020, 8 pages.
Sathyanarayana et al., "Role of promoters in improving adhesions of organic coatingsto a substrate", Progress in Organic Coatings26, 275-313, 1995.
Solvay, AlbritectCP 40, Product Data Sheet E90058437, Oct. 2013, 2 pages.
Chinese Application No. 201980090742.9, "Office Action", dated Sep. 1, 2022, 28 pages.
Japanese Application No. 2021-538389, "Office Action", dated Jun. 28, 2022, 6 pages.
European Application No. 19839613.7, "Office Action", dated Sep. 28, 2022, 4 pages.
Canadian Application No. 3,124,972, "Office Action", dated Oct. 21, 2022, 3 pages.
European Application No. 19839613.7, "Office Action", dated Apr. 17, 2023, 5 pages.
Brazilian Application No. BR112021012838-7, "Office Action" dated Nov. 8, 2022, 5 pages.
Japanese Application No. 2021-538389, "Office Action" dated Jan. 10, 2023, 8 pages.
Korean Application No. 10-2021-7023984, "Office Action" dated Nov. 14, 2022, 22 pages.
CA Application No. 3,124,972, "Office Action", dated Jun. 8, 2023, 3 pages.
CN Application No. 201980090742.9, "Office Action", dated Apr. 13, 2023, 21 pages.
JP Application No. 2021-538389, "Office Action", dated Jun. 6, 2023, 10 pages.
KR Application No. 10-2021-7023984, "Office Action", dated May 24, 2023, 6 pages.

* cited by examiner

SYSTEMS AND METHODS FOR LAMINATING CAN END STOCK

CROSS-REFERENCE TO RELATED APPLICATION

The present application claims priority to and filing benefit of U.S. Provisional Patent Application No. 62/787,582, filed on Jan. 2, 2019, which is incorporated herein by reference in its entirety.

TECHNICAL FIELD

The present disclosure relates to metalworking generally and more specifically to laminating and pre-treating metal strips.

BACKGROUND

Certain metal products, such as aluminum beverage cans, may require a protective layer, such as a polymer coating, between the metal and its contents. For example, beverage cans often must provide sufficient protection between the metal of the beverage can and the beverage contained therein to avoid damage to the metal from harsh beverages, such as sodas and colas, as well as to avoid undesirable effects to the beverage, such as discoloration or change in taste.

There are often requirements placed on the protective layer with regard to its fundamental properties. It can be desirable to produce a laminated metal product that meets various requirements. In some cases, it can be desirable to laminate a metal product rather than lacquer a metal product. Laminating metal products presents new challenges for application when, for example, a polymer coating is not in a liquid state (e.g., a semi-solid, a soft material, a gel, a molten material, or a thermoplastic). Lamination requires wetting of a surface of the metal products by a laminate material (i.e., completely and uniformly contacting the metal products) for acceptable adhesion to the metal products. In some cases, it can be desirable to employ an intermediate layer to promote adhesion of the protective layer to the metal products.

In some examples, certain can end stock (CES) used in beverage cans must have a protective layer that has less than a maximum amount of feathering. Feathering can refer to elongation and delamination of the protective layer, especially at breaks in the metal, such as an opening created when breaking a scored orifice of a beverage can (e.g., when opening a pop-top).

Feathering is a consistent problem in the art; however, the mechanism causing feathering is not well understood. When standard adhesion tests (e.g., a cross hatch test) indicate an adhesion weakness, feathering is often extreme. However, even when standard adhesion tests do not indicate a weakness in adhesion, unacceptable feathering is often observed. This has been particularly true for laminates which exhibit higher elasticity than traditional coatings (e.g., epoxy). Therefore, industry efforts have traditionally focused on elasticity of the protective layer as a cause of feathering while ignoring the adhesion of the protective layer to the metal products. To ensure metal products laminated with polymers meet the desired requirements, it has been asserted that certain limitations must be placed on the choice of material and treatment processes with respect to the elasticity of the protective layer. These limitations can include restrictions on polymer choice.

In some cases, the protective layer must withstand acid tests, such as an acetic acid test or a citric acid test. Acid tests involve assessing the resistance of a coating against diluted acidic media, as further described below. The coated metal product may need to conform to one or more of these and other requirements.

DETAILED DESCRIPTION

Figure 1:
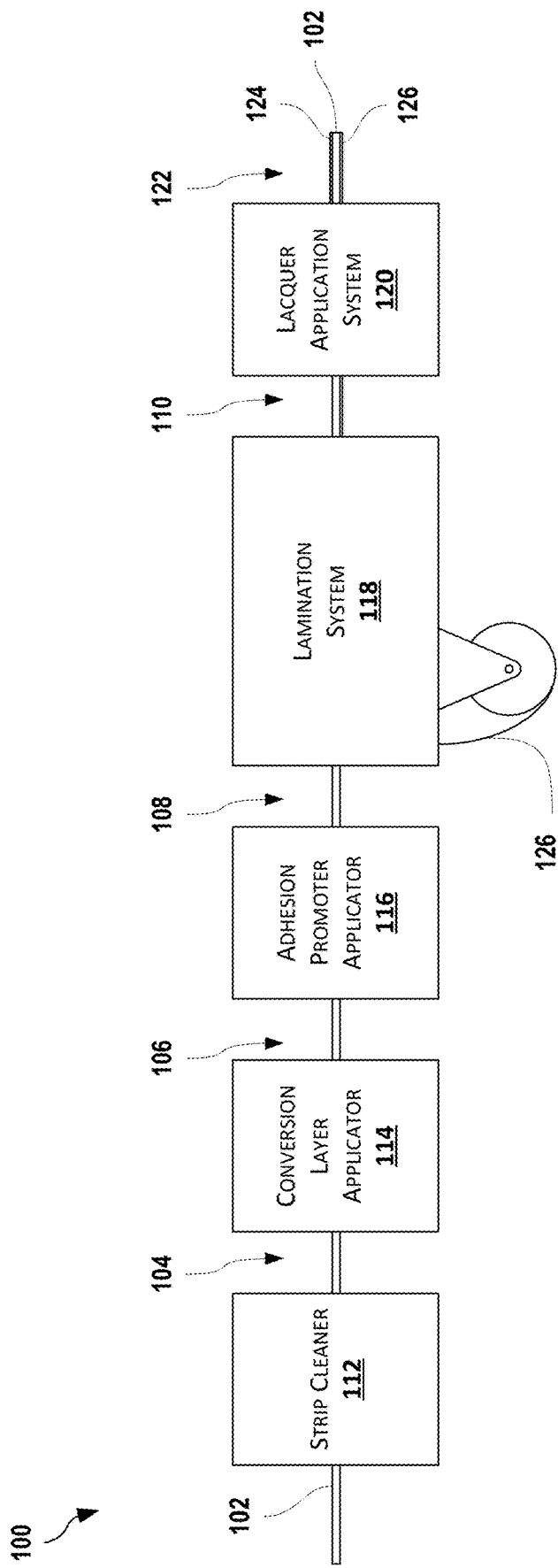
FIG. 1 is a schematic diagram of a system for preparing can end stock according to certain aspects of the present disclosure.

Disclosed herein is an improved aluminum can end stock (CES). As used herein, CES is a rolled metal product (e.g., a rolled aluminum alloy strip) that is amenable to being cut and formed into a can end (e.g., a pop-top end, a pull-top end, or the like). The CES includes an adhered polymer coating exhibiting low feathering and high performance in various acid tests. The low feathering and resistance to acid tests is accomplished by incorporating a copolymer adhesion promoter film to an aluminum alloy before lamination, as described below.

It has been determined that an adhered polymer film (e.g., PET) must first be peeled away (e.g., delaminated) from an aluminum alloy to allow that portion of delaminated film to stretch or elongate, thus providing feathering. A length of the feathers extending over the edge of the aluminum becomes a function of the peeled length of the polymer film (e.g., PET) and its elongation at break. Therefore, it has been found that enhanced adhesion can reduce the delamination of the film from the aluminum, thus limiting the amount of film available for elongation which in turn reduces the amount of feathering.

Additionally, feathering can allow delamination of the adhered polymer film caused by water from a liquid stored within a container created from the aluminum alloy (e.g., an aluminum beverage can). A feathered film can allow the water (e.g., liquid water stored in the can, or water vapor present in the can) to propagate between the metal of the can end and the laminated film. Such water ingress can significantly delaminate the laminated film. In some cases, delamination can be accelerated by carbonated liquids and/or pressurized liquids.

Definitions and Descriptions

The terms "invention," "the invention," "this invention" and "the present invention" used herein are intended to refer broadly to all of the subject matter of this patent application and the claims below. Statements containing these terms should be understood not to limit the subject matter described herein or to limit the meaning or scope of the patent claims below.

In this description, reference is made to alloys identified by aluminum industry designations, such as "series" or "5xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, terms such as "cast metal product," "cast product," "cast aluminum alloy product," and the like are interchangeable and refer to a product produced by direct chill casting (including direct chill co-casting) or semi-continuous casting, continuous casting (including, for example, by use of a twin belt caster, a twin roll caster, a twin block caster, or any other continuous caster), electromagnetic casting, hot top casting, or any other casting method.

As used herein, the meaning of "a," "an," or "the" includes singular and plural references unless the context clearly dictates otherwise.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C. As used herein, the meaning of "ambient conditions" can include temperatures of about room temperature, relative humidity of from about 20% to about 100%, and barometric pressure of from about 975 millibar (mbar) to about 1050 mbar. For example, relative humidity can be about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100%, or anywhere in between. For example, barometric pressure can be about 975 mbar, about 980 mbar, about 985 mbar, about 990 mbar, about 995 mbar, about 1000 mbar, about 1005 mbar, about 1010 mbar, about 1015 mbar, about 1020 mbar, about 1025 mbar, about 1030 mbar, about 1035 mbar, about 1040 mbar, about 1045 mbar, about 1050 mbar, or anywhere in between.

All ranges disclosed herein are to be understood to encompass any and all endpoints and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

As used herein, the term crystalline can include a monocrystalline structure, a polycrystalline structure, a semicrystalline structure, and/or any combination thereof.

As used herein, the term polymer is inclusive of homopolymers and copolymers. Homopolymer refers to a polymer derived from a single polymerizable monomer. Copolymer refers to a polymer derived from two or more polymerizable monomers.

As used herein, water sensibility refers to a material being readily affected by water. For example, the water sensibility of a laminated film refers to a delamination if an adhesive or adhesion promoter between the laminated film and substrate is exposed to water.

Adhesion Promoter-Treated Can End Stock

Certain aspects and features of the present disclosure relate to aluminum can end stock (CES). CES as used herein refers to an aluminum alloy that can be formed to a shape to serve as a closure for an aluminum can. The closure can include a scored orifice that can be broken by a consumer to form an opening in the can end to retrieve any product stored within the can. Certain aspects and features of the present disclosure relate to CES coated with an adhesion promoter and laminated with a polymer coating exhibiting very low feathering due to the enhanced adhesion to the aluminum alloy provided by the adhesion promoter. The laminated CES (i.e., aluminum alloy metal strip) can optionally include a conversion layer and the adhered polymer coating on an interior-facing side (e.g., product side).

The can end stock product described herein includes a metal strip that has a first side and a second side. The first side can include an adhesion promoter layer coupled to a polymer film layer. The adhesion promoter layer includes an adhesion promoter, which can be a polymer (e.g., a copolymer or an acidic polymer), a silane, a titanate, an epoxy, or a mixture thereof, as further described below.

In some examples, the adhesion promoter can be a polymer, such as a homopolymer or a copolymer. Optionally, the adhesion promoter is a copolymer. Suitable copolymers as described herein include block copolymers, random copolymers, graft copolymers, copolymer blends, homopolymers, statistical copolymers, periodic copolymers, alternating copolymers, star copolymers, starblock copolymers, and/or any combinations thereof. The copolymers can be configured as head-to-head copolymers and/or as head-to-tail copolymers. The weight average molecular weight (MO of the copolymers can be between about 50 grams per mole (g/mol) and about 500,000 g/mol. For example, the $M_w$, can be from about 20,000 g/mol to about 400,000 g/mol; from about 30,000 g/mol to about 300,000 g/mol; or from about 40,000 g/mol to about 100,000 g/mol, or any value in between. For example, the $M_w$, can be 50 g/mol, 100 g/mol, 200 g/mol, 300 g/mol, 400 g/mol, 500 g/mol, 600 g/mol, 700 g/mol, 800 g/mol, 900 g/mol, 1,000 g/mol, 2,000 g/mol, 3,000 g/mol, 4,000 g/mol, 5,000 g/mol, 6,000 g/mol, 7,000 g/mol, 8,000 g/mol, 9,000 g/mol, 10,000 g/mol, 20,000 g/mol, 30,000 g/mol, 40,000 g/mol, 50,000 g/mol, 60,000 g/mol, 70,000 g/mol, 80,000 g/mol, 90,000 g/mol, 100,000 g/mol, 110,000 g/mol, 120,000 g/mol, 130,000 g/mol, 140,000 g/mol, 150,000 g/mol, 160,000 g/mol, 170,000 g/mol, 180,000 g/mol, 190,000 g/mol, 200,000 g/mol, 210,000 g/mol, 220,000 g/mol, 230,000 g/mol, 240,000 g/mol, 250,000 g/mol, 260,000 g/mol, 270,000 g/mol, 280,000 g/mol, 290,000 g/mol, 300,000 g/mol, 310,000 g/mol, 320,000 g/mol, 330,000 g/mol, 340,000 g/mol, 350,000 g/mol, 360,000 g/mol, 370,000 g/mol, 380,000 g/mol, 390,000 g/mol, 400,000 g/mol, 410,000 g/mol, 420,000 g/mol, 430,000 g/mol, 440,000 g/mol, 450,000 g/mol, 460,000 g/mol, 470,000 g/mol, 480,000 g/mol, 490,000 g/mol, or 500,000 g/mol.

Optionally, the adhesion promoter is a carboxylic acid-containing polymer, copolymer, or derivative thereof. Optionally, the adhesion promoter is a phosphoric acid-containing or phosphonic acid-containing polymer, copolymer, or derivative thereof. Optionally, the adhesion promoter is a vinyl phosphonic acid-carboxylic acid copolymer or derivative thereof. In some non-limiting examples, the copolymer adhesion promoter can be a commercially available poly(vinyl phosphonic acid-co-acrylic acid).

In some examples, the adhesion promoter is a silane-containing compound (i.e., a silane). Suitable silanes include, for example, fluorosilanes, silanamines, silanols, silanones, halosilanes, organosilanes, heterosilanes, and organoheterosilanes.

Suitable polymers for use as the adhesion promoter can have a $M_w$ between about 100 g/mol and about 500,000 g/mol. For example, the $M_w$ can be from about 20,000 g/mol to about 400,000 g/mol; from about 30,000 g/mol to about 300,000 g/mol; or from about 40,000 g/mol to about 100,000 g/mol, or any value in between. For example, the $M_w$ can be 100 g/mol, 200 g/mol, 300 g/mol, 400 g/mol, 500 g/mol, 600 g/mol, 700 g/mol, 800 g/mol, 900 g/mol, 1,000 g/mol, 2,000 g/mol, 3,000 g/mol, 4,000 g/mol, 5,000 g/mol, 6,000 g/mol, 7,000 g/mol, 8,000 g/mol, 9,000 g/mol, 10,000 g/mol, 20,000 g/mol, 30,000 g/mol, 40,000 g/mol, 50,000 g/mol, 60,000 g/mol, 70,000 g/mol, 80,000 g/mol, 90,000 g/mol, 100,000 g/mol, 110,000 g/mol, 120,000 g/mol, 130,000 g/mol, 140,000 g/mol, 150,000 g/mol, 160,000 g/mol, 170,000 g/mol, 180,000 g/mol, 190,000 g/mol, 200,000 g/mol, 210,000 g/mol, 220,000 g/mol, 230,000 g/mol, 240,000 g/mol, 250,000 g/mol, 260,000 g/mol, 270,000 g/mol, 280,000 g/mol, 290,000 g/mol, 300,000 g/mol, 310,000 g/mol, 320,000 g/mol, 330,000 g/mol, 340,000 g/mol, 350,000 g/mol, 360,000 g/mol, 370,000 g/mol, 380,000 g/mol, 390,000 g/mol, 400,000 g/mol, 410,000 g/mol, 420,000 g/mol, 430,000 g/mol, 440,000 g/mol, 450,000 g/mol, 460,000 g/mol, 470,000 g/mol, 480,000 g/mol, 490,000 g/mol, or 500,000 g/mol.

In some examples, the adhesion promoter is a titanate. Optionally, the titanate is an organotitanate compound, such as a titanium orthoester or an organo-titanium chelate. Optionally, the titanate is an inorganic titanate compound wherein the titanate is selected from a group consisting of barium titanate, strontium titanate, calcium titanate, and dysprosium titanate.

In some examples, the adhesion promoter is an epoxy. In some examples, the epoxy can be novolac epoxy resin, aliphatic epoxy resin, glycidylamine epoxy resin, an epoxy ester, an epoxy phosphate ester (e.g., URAD DD 79 which is commercially available from DSM NeoResins+, Inc.; Wilmington, MA), and/or any combination thereof.

The polymer film layer can include polyesters, epoxies, polyurethanes, polyolefins (e.g., polyvinyls), polyacrylics, polymethacrylics, polyamides, and silicones. Suitable polymer film layers can include, for example, polymer film layers that are commercially available. For example, the polymer film can include films for hot lamination, such as those commercially available from Mitsubishi Polymer Film, Inc. (Greer, SC), DuPont (Wilmington, DE), and Toray Plastics (America), Inc. (North Kingstown, RI).

Optionally, the polymer film layer can be a polyester. In some non-limiting cases, the polymer film can be a Mitsubishi RHSL or Mitsubishi RBLS film (Mitsubishi Polyester Film, Inc.), a MYLAR polyester film (DuPont), or a LUMIRROR polyester film (Toray Plastics (America), Inc.). Optionally, the polymer film layer can be a polyethylene terephthalate (PET) film layer. In some examples, the PET film layer includes a polymer derived from ethylene glycol, terephthalic acid or a terephthalate-containing compound, and optionally one or more additional comonomers. The one or more additional comonomers can be used to tailor the properties of the film layer, such as the melting temperature. Exemplary comonomers for use as the additional comonomers can include isophthalic acid, butylene diol, 2-methyl-1,3-propanediol, phthalate, 1,8-naphthalenedicarboxylate, and 1,8-anthracenedicarboxylate, to name a few. Optionally, the polymer film layer includes a polyethylene naphthalate film.

Optionally, the polymer film layer can include a polyamide. The polyamide can be any macromolecule with repeating units linked by amide bonds. Examples of suitable polyamides include, but are not limited to, nylons (e.g., nylon 6; nylon 6,6; nylon 6,10; nylon 11; nylon 12), aramids (e.g., hexamethylenediamine and terephthalic acid), and polyphthalamides (e.g., paraphenylenediamine and terephthalic acid). Preferred polyamides include nylon 12. In some aspects, the polymer film layer can consist entirely of polyamide. In other aspects where the film layer contains polyamide, the polymer film layer can consist of at least 10 wt. % polyamide (e.g., at least 25 wt. % polyamide, at least 30 wt. % polyamide, at least 50 wt. % polyamide, at least 70 wt. % polyamide, at least 80 wt. % polyamide, at least 85 wt. % polyamide, at least 90 wt. % polyamide, at least 93 wt. % polyamide, at least 95 wt. % polyamide, at least 96 wt. % polyamide, at least 97 wt. % polyamide, at least 98 wt. % polyamide, at least 99 wt. % polyamide, at least 99.5 wt. % polyamide, or at least at least 99.8 wt. % polyamide). In some aspects, where the polymer film comprises polyamide, the film can comprise more than one polyamide, e.g., at least two polyamides or three polyamides.

The thickness of the polymer film layer comprising a polyamide can, in some aspects, be less than 100 µm, e.g., less than 50 µm, less than 30 µm, less than 25 µm, less than 20 µm, less than 15 µm, or less than 10 µm. In terms of ranges, the thickness of the polymer film layer comprising a polyamide can, in some aspects, be from 5 µm to 100 µm, e.g., from 5 µm to 50 µm, from 5 µm to 25 µm, from 5 µm to 20 µm, from 5 µm to 15 µm, or from 10 µm to 20 µm. Beneficially, polymer film layers comprising a polyamide can exhibit low blushing after pasteurization and no leaching of materials from the layer.

In some aspects involving a polymer film layer comprising a polyamide, the film layer can be applied without an adhesion promoter. For example, the polyamide containing films can be laminated to a can end substrate using a suitable application temperature. An example of a suitable application temperature is a temperature at which the polymer film layer softens but the temperature is below the full melting temperature. In some aspects, the laminated polyamide containing polymer film might be subjected to an annealing step as described herein. However, in other aspects involving a polymer film layer comprising a polyamide, the polymer film layer is applied with an adhesion promotor as described herein.

Suitable polymers for use as the polymer film layer can have $M_w$ of the copolymers between about 10,000 g/mol and about 500,000 g/mol. For example, the $M_w$ can be from about 20,000 g/mol to about 400,000 g/mol; from about 30,000 g/mol to about 300,000 g/mol; or from about 40,000 g/mol to about 100,000 g/mol, or any value in between. For example, the $M_w$ can be 10,000 g/mol, 20,000 g/mol, 30,000 g/mol, 40,000 g/mol, 50,000 g/mol, 60,000 g/mol, 70,000 g/mol, 80,000 g/mol, 90,000 g/mol, 100,000 g/mol, 110,000 g/mol, 120,000 g/mol, 130,000 g/mol, 140,000 g/mol, 150,000 g/mol, 160,000 g/mol, 170,000 g/mol, 180,000 g/mol, 190,000 g/mol, 200,000 g/mol, 210,000 g/mol, 220,000 g/mol, 230,000 g/mol, 240,000 g/mol, 250,000 g/mol, 260,000 g/mol, 270,000 g/mol, 280,000 g/mol, 290,000 g/mol, 300,000 g/mol, 310,000 g/mol, 320,000 g/mol, 330,000 g/mol, 340,000 g/mol, 350,000 g/mol, 360,000 g/mol, 370,000 g/mol, 380,000 g/mol, 390,000 g/mol, 400,000 g/mol, 410,000 g/mol, 420,000 g/mol, 430,000 g/mol, 440,000 g/mol, 450,000 g/mol, 460,000 g/mol, 470,000 g/mol, 480,000 g/mol, 490,000 g/mol, or 500,000 g/mol.

In some cases, the polymer film laminated to the metal strip can be a biaxially oriented polymer, such as a polyethylene terephthalate (PET) film from a continuous production line. The polymer film can include only a main component (e.g., a PET layer), or can include a main component and one or more supplemental components (e.g., adhesive layers).

The adhesion promoter layer and the polymer film layer can be coupled using mechanical bonding, van der Waals forces, polar-polar interactions, or any suitable mechanism initiated by intimate contact between the metal strip, the conversion layer, and/or the adhesion promoter layer and the polymer film layer to be laminated onto the metal strip.

As mentioned, the first side of the metal strip can further include a conversion layer. The conversion layer can be arranged opposite the adhesion promoter layer from the polymer film layer. In some cases, the conversion layer can include compounds of trivalent chromium (Cr(III)) and phosphates. In some cases, the conversion layer can include compounds of titanium and zirconium (Ti—Zr). The optional conversion layer can provide enhanced adhesion, low blushing after pasteurization, and good corrosion performance in an acid test (e.g., an acetic acid test or a citric acid test). In some cases, the metal strip can include one or more optional conversion layers located on an interior-facing side (e.g., product side) and/or an exterior-facing side (e.g., consumer side).

In some examples, a second side of the metal strip can include at least one of a lacquer layer or a polymer layer. Optionally, the second side of the metal strip includes both a lacquer layer and a polymer layer. The polymer layer can be the polymer film layer as described above. The polymer layer can optionally be any suitable polymer coating (e.g., a paint, a laminate, a wrap, or an ink).

In some examples, the can end stock can be formed into a can end product. In some further examples, the can end product can be scored such that the scoring defines an openable scored orifice. The scored orifice can be openable to form a can end opening. As described herein, the scored orifice of the can end product is devoid of visible feathered portions of the polymer film layer upon opening the orifice.

The can end stock product described above provides unexpected benefits as compared to other can end stock products due, at least in part, to the use of the adhesion promoter. The use of an adhesion promoter when preparing a laminated aluminum alloy metal strip (i.e., a metal strip) provides, for example, improved feathering performance. Not to be bound by theory, in some examples, the adhesion promoter can wet the metal strip (i.e., completely and uniformly contact the metal strip). In some further examples, the adhesion promoter applied to the metal strip can bind with the polymer coating. In some cases, the adhesion promoter can improve adhesion of a film to a metal strip beyond industry accepted limits.

In some further examples, the combined use of a conversion layer and an adhesion promoter when preparing a laminated metal strip can provide unexpected benefits, including improved feathering performance. In some examples, the adhesion promoter can wet the conversion layer and can bind with the polymer coating further promoting adhesion. For example, the adhesion promoter can function similarly to a primer. As such, binding the polymer coating to the conversion layer can be strengthened by the adhesion promoter.

In certain aspects, improved feathering performance reduces or eliminates delamination of a film adhered to a metal strip. In some non-limiting examples, a film laminated onto a CES product as described herein can delaminate from, for example, a can end when the can is opened. In some aspects, opening a can includes a prescribed tearing of the film to create the opening. The prescribed tearing can result in feathering as described above. In some cases, when feathering occurs, water (e.g., from a liquid stored in the can, or water vapor from liquid stored in the can) can propagate between the film and the metal strip. Water ingress between the film and the metal strip can break adhesive bonds formed during the lamination process described above, releasing the film from the metal strip (e.g., delaminating the film). Accordingly, an improved feathering response, as described above, can eliminate delamination caused by water ingress between the film and the metal strip.

In some non-limiting examples, the feathering response can be improved sufficiently to eliminate the delamination by optimizing a coating weight of the adhesion promoter on the metal strip. For example, a coating weight deposited by applying to the metal strip the adhesion promoter from an aqueous solution containing from about 0.08 wt. % to about 0.45 wt. % (e.g., from about 0.2 wt. % to about 0.32 wt. %, from about 0.1 wt. % to about 0.44 wt. %, from about 0.11 wt. % to about 0.43 wt. %, from about 0.12 wt. % to about 0.42 wt. %, from about 0.13 wt. % to about 0.41 wt. %, from about 0.14 wt. % to about 0.4 wt. %, from about 0.15 wt. % to about 0.39 wt. %, from about 0.16 wt. % to about 0.38 wt. %, from about 0.17 wt. % to about 0.37 wt. %, from about 0.18 wt. % to about 0.36 wt. %, from about 0.19 wt. % to about 0.35 wt. %, from about 0.2 wt. % to about 0.34 wt. %, from about 0.21 wt. % to about 0.33 wt. %, from about 0.22 wt. % to about 0.32 wt. %, from about 0.23 wt. % to about 0.31 wt. %, from about 0.24 wt. % to about 0.3 wt. %, from about 0.25 wt. % to about 0.29 wt. %, or from about 0.26 wt. % to about 0.28 wt. %). The adhesion promoter can eliminate delamination by water ingress and thus can provide optimal adhesion of the film onto the metal strip. For example, delamination can be eliminated by applying to the metal strip the adhesion promoter from an aqueous solution containing the adhesion promoter in an amount of about 0.08 wt. %, about 0.09 wt. %, about 0.1 wt. %, about 0.11 wt. %, about 0.12 wt. %, about 0.13 wt. %, about 0.14 wt. %, about 0.15 wt. %, about 0.16 wt. %, about 0.17 wt. %, about 0.18 wt. %, about 0.19 wt. %, about 0.2 wt. %, about 0.21 wt. %, about 0.22 wt. %, about 0.23 wt. %, about 0.24 wt. %, about 0.25 wt. %, about 0.26 wt. %, about 0.27 wt. %, about 0.28 wt. %, about 0.29 wt. %, about 0.3 wt. %, about 0.31 wt. %, about 0.32 wt. %, about 0.33 wt. %, about 0.34 wt. %, about 0.35 wt. %, about 0.36 wt. %, about 0.37 wt. %, about 0.38 wt. %, about 0.39 wt. %, about 0.4 wt. %, about 0.41 wt. %, about 0.42 wt. %, about 0.43 wt. %, about 0.44 wt. %, or about 0.45 wt. %.

In further examples, surprisingly, a higher coating weight of the adhesion promoter can be used when the film is exposed to water (e.g., tap water, distilled water, demineralized water, or deionized water) for a period of time at a desired temperature before opening the can. The period of time and the desired temperature are proportional to each other (e.g., a higher temperature and a shorter time can provide the eliminated delamination). In some cases, the adhesion promoter can be applied to a metal strip from an aqueous solution containing 0.28 wt. % to about 0.45 wt. % (e.g., from about 0.29 wt. % to about 0.44 wt. %, from about 0.3 wt. % to about 0.43 wt. %, from about 0.31 wt. % to about 0.42 wt. %, from about 0.32 wt. % to about 0.41 wt. %, from about 0.33 wt. % to about 0.4 wt. %, from about 0.34 wt. % to about 0.39 wt. %, from about 0.35 wt. % to about 0.38 wt. %, or from about 0.36 wt. % to about 0.37 wt. %) of the adhesion promoter. For example, the adhesion promoter can be applied to a metal strip from an aqueous solution containing the adhesion promoter in an amount of 0.28 wt. %, 0.29 wt. %, 0.3 wt. %, 0.31 wt. %, 0.32 wt. %, 0.33 wt. %, 0.34 wt. %, 0.35 wt. %, 0.36 wt. %, 0.37 wt. %, 0.38 wt. %, 0.39 wt. %, 0.4 wt. %, 0.41 wt. %, 0.42 wt. %, 0.43 wt. %, 0.44 wt. %, or 0.45 wt. %.

For example, applying the adhesion promoter from an aqueous solution containing from about 0.28 wt. % to about 0.45 wt. % of the adhesion promoter can eliminate delamination by water ingress after exposure to water for about 24 hours to about 120 hours at about 8° C., about 24 hours to about 120 hours at room temperature, about 30 minutes to about 60 minutes at about 60° C., about 15 minutes to about 60 minutes at 80° C., or about 5 minutes to about 60 minutes at 100° C.

Thus, when a storage temperature is from about 5° C. to about 30° C. (e.g., from about 6° C. to about 29° C., from about 7° C. to about 28° C., from about 8° C. to about 27° C., from about 9° C. to about 26° C., from about 10° C. to about 25° C., from about 11° C. to about 24° C., from about 12° C. to about 23° C., from about 13° C. to about 22° C., from about 14° C. to about 21° C., from about 15° C. to about 20° C., from about 16° C. to about 19° C., or from about 17° C. to about 18° C.), storing an aqueously filled can for about 24 hours to about 120 hours (e.g., from about 25 hours to about 119 hours, from about 26 hours to about 118 hours, from about 27 hours to about 117 hours, from about 28 hours to about 116 hours, from about 29 hours to about 115 hours, from about 30 hours to about 114 hours, from about 31 hours to about 113 hours, from about 32 hours to about 112 hours, from about 33 hours to about 111 hours, from about 34 hours to about 110 hours, from about 35 hours to about 109 hours, from about 36 hours to about 108 hours, from about 37 hours to about 107 hours, from about 38 hours to about 106 hours, from about 39 hours to about 105 hours, from about 40 hours to about 104 hours, from about 41 hours to about 103 hours, from about 42 hours to about 102 hours, from about 41 hours to about 101 hours, from about 42 hours to about 100 hours, from about 43 hours to about 99 hours, from about 44 hours to about 98 hours, from about 45 hours to about 97 hours, from about 46 hours to about 96 hours, from about 47 hours to about 95 hours, from about 48 hours to about 94 hours, from about 49 hours to about 93 hours, from about 50 hours to about 92 hours, from about 51 hours to about 91 hours, from about 52 hours to about 90 hours, from about 53 hours to about 89 hours, from about 54 hours to about 88 hours, from about 55 hours to about 87 hours, from about 56 hours to about 86 hours, from about 57 hours to about 85 hours, from about 58 hours to about 86 hours, from about 59 hours to about 85 hours, from about 60 hours to about 84 hours, from about 61 hours to about 83 hours, from about 62 hours to about 82 hours, from about 63 hours to about 81 hours, from about 64 hours to about 80 hours, from about 65 hours to about 79 hours, from about 66 hours to about 78 hours, from about 67 hours to about 77 hours, from about 68 hours to about 76 hours, from about 69 hours to about 75 hours, from about 70 hours to about 74 hours, or from about 71 hours to about 73 hours) can eliminate delamination from water ingress between the film and the metal after opening. For example, the storage temperature can be about 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., or 30° C. Additionally, for example, the aqueously filled can may be stored at the storage temperature for about 24 hours, 25 hours, 26 hours, 27 hours, 28 hours, 29 hours, 30 hours, 31 hours, 32 hours, 33 hours, 34 hours, 35 hours, 36 hours, 37 hours, 38 hours, 39 hours, 40 hours, 41 hours, 42 hours, 43 hours, 44 hours, 45 hours, 46 hours, 47 hours, 48 hours, 49 hours, 50 hours, 51 hours, 52 hours, 53 hours, 54 hours, 55 hours, 56 hours, 57 hours, 58 hours, 59 hours, 60 hours, 61 hours, 62 hours, 63 hours, 64 hours, 65 hours, 66 hours, 67 hours, 68 hours, 69 hours, 70 hours, 71 hours, 72 hours, 73 hours, 74 hours, 75 hours, 76 hours, 77 hours, 78 hours, 79 hours, 80 hours, 81 hours, 82 hours, 83 hours, 84 hours, 85 hours, 86 hours, 87 hours, 88 hours, 89 hours, 90 hours, 91 hours, 92 hours, 93 hours, 94 hours, 95 hours, 96 hours, 97 hours, 98 hours, 99 hours, 100 hours, 101 hours, 102 hours, 103 hours, 104 hours, 105 hours, 106 hours, 107 hours, 108 hours, 109 hours, 110 hours, 111 hours, 112 hours, 113 hours, 114 hours, 115 hours, 116 hours, 117 hours, 118 hours, 119 hours, or 120 hours.

In some cases, when the storage temperature, or in some aspects a heat treatment temperature, is about 60° C., storing an aqueously filled can for from about 30 minutes to about 60 minutes (e.g., from about 31 minutes to about 59 minutes, from about 32 minutes to about 58 minutes, from about 33 minutes to about 57 minutes, from about 34 minutes to about 56 minutes, from about 35 minutes to about 55 minutes, from about 36 minutes to about 54 minutes, from about 37 minutes to about 53 minutes, from about 38 minutes to about 52 minutes, from about 39 minutes to about 51 minutes, from about 40 minutes to about 50 minutes, from about 41 minutes to about 49 minutes, from about 42 minutes to about 48 minutes, from about 43 minutes to about 47 minutes, or from about 44 minutes to about 46 minutes) can eliminate delamination from water ingress between the film and the metal after opening. For example, the aqueously filled can may be stored at about 60° C. for about 30 minutes, 31 minutes, 32 minutes, 33 minutes, 34 minutes, 35 minutes, 36 minutes, 37 minutes, 38 minutes, 39 minutes, 40 minutes, 41 minutes, 42 minutes, 43 minutes, 44 minutes, 45 minutes, 46 minutes, 47 minutes, 48 minutes, 49 minutes, 50 minutes, 51 minutes, 52 minutes, 53 minutes, 54 minutes, 55 minutes, 56 minutes, 57 minutes, 58 minutes, 59 minutes, or 60 minutes.

In some further cases, when the storage temperature and/or the heat treatment temperature is about 80° C., storing an aqueously filled can for from about 15 minutes to about 60 minutes (e.g., from about 16 minutes to about 59 minutes, from about 17 minutes to about 58 minutes, from about 18 minutes to about 57 minutes, from about 19 minutes to about 56 minutes, from about 20 minutes to about 55 minutes, from about 21 minutes to about 54 minutes, from about 22 minutes to about 53 minutes, from about 23 minutes to about 52 minutes, from about 24 minutes to about 51 minutes, from about 25 minutes to about 50 minutes, from about 26 minutes to about 49 minutes, from about 27 minutes to about 48 minutes, from about 28 minutes to about 47 minutes, from about 29 minutes to about 46 minutes, from about 30 minutes to about 45 minutes, from about 31 minutes to about 44 minutes, from about 32 minutes to about 43 minutes, from about 33 minutes to about 42 minutes, from about 34 minutes to about 41 minutes, from about 35 minutes to about 40 minutes, from about 36 minutes to about 39 minutes, or from about 37 minutes to about 38 minutes) can eliminate delamination from water ingress between the film and the metal after opening. For example, the aqueously filled can may be stored at about 80° C. for about 15 minutes, 16 minutes, 17 minutes, 18 minutes, 19 minutes, 20 minutes, 21 minutes, 22 minutes, 23 minutes, 24 minutes, 25 minutes, 26 minutes, 27 minutes, 28 minutes, 29 minutes, 30 minutes, 31 minutes, 32 minutes, 33 minutes, 34 minutes, 35 minutes, 36 minutes, 37 minutes, 38 minutes, 39 minutes, 40 minutes, 41 minutes, 42 minutes, 43 minutes, 44 minutes, 45 minutes, 46 minutes, 47 minutes, 48 minutes, 49 minutes, 50 minutes, 51 minutes, 52 minutes, 53 minutes, 54 minutes, 55 minutes, 56 minutes, 57 minutes, 58 minutes, 59 minutes, or 60 minutes.

In some cases, when the storage temperature and/or a heat treatment temperature is about 100° C., storing an aqueously filled can for about 5 minutes to about 60 minutes (e.g., from about 6 minutes to about 59 minutes, from about 7 minutes to about 58 minutes, from about 8 minutes to about 57 minutes, from about 9 minutes to about 56 minutes, from about 10 minutes to about 55 minutes, from about 11 minutes to about 54 minutes, from about 12 minutes to about 53 minutes, from about 13 minutes to about 52 minutes, from about 14 minutes to about 51 minutes, from about 15 minutes to about 50 minutes, from about 16 minutes to about 49 minutes, from about 17 minutes to about 48 minutes, from about 18 minutes to about 47 minutes, from about 19 minutes to about 46 minutes, from about 20 minutes to about 45 minutes, from about 21 minutes to about 44 minutes, from about 22 minutes to about 43 minutes, from about 23 minutes to about 42 minutes, from about 24 minutes to about 41 minutes, from about 25 minutes to about 40 minutes, from about 26 minutes to about 39 minutes, from about 27 minutes to about 38 minutes, from about 28 minutes to about 37 minutes, from about 29 minutes to about 36 minutes, from about 30 minutes to about 35 minutes, from about 31 minutes to about 34 minutes, or from about 32 minutes to about 33 minutes) can eliminate delamination from water ingress between the film and the metal after opening. For example, the aqueously filled can may be stored at about 100° C. for about 5 minutes, 6 minutes, 7 minutes, 8 minutes, 9 minutes, 10 minutes, 11 minutes, 12 minutes, 13 minutes, 14 minutes, 15 minutes, 16 minutes, 17 minutes, 18 minutes, 19 minutes, 20 minutes, 21 minutes, 22 minutes, 23 minutes, 24 minutes, 25 minutes, 26 minutes, 27 minutes, 28 minutes, 29 minutes, 30 minutes, 31 minutes, 32 minutes, 33 minutes, 34 minutes, 35 minutes, 36 minutes, 37 minutes, 38 minutes, 39 minutes, 40 minutes, 41 minutes, 42 minutes, 43 minutes, 44 minutes, 45 minutes, 46 minutes, 47 minutes, 48 minutes, 49 minutes, 50 minutes, 51 minutes, 52 minutes, 53 minutes, 54 minutes, 55 minutes, 56 minutes, 57 minutes, 58 minutes, 59 minutes, or 60 minutes.

Process for Making

The disclosed laminated CES product (e.g., laminated metal strip) can be produced using a process as described herein. The process can be performed on one or more sides of a metal strip to result in a metal strip that is advantageously laminated on one or more sides. As described herein, in some cases, the metal product can include a product-facing side that is laminated using the process disclosed herein and a consumer-facing side that is lacquered using standard lacquering techniques. The process includes the steps of (1) cleaning the metal strip before coating, (2) optionally pre-treating the metal strip with a conversion layer, (3) applying an adhesion promoter to the metal strip, and (4) laminating the metal strip. These steps are further described below.

The process can include cleaning the metal strip before coating. In some cases, the metal strip is cleaned with an acid treatment. For example, the cleaning process can include an acid treatment comprising sulfuric acid ($H_2SO_4$), hydrofluoric acid (HF), phosphoric acid ($H_3PO_4$), nitric acid ($HNO_3$), hydrochloric acid (HCl), hydrobromic acid (HBr), perchloric acid ($HClO_4$), hydroiodic acid (HI), boric acid ($H_3BO_3$), and/or any combination thereof. In some cases, the metal strip is cleaned with an alkaline (i.e., a base) treatment. For example, the cleaning process can include an alkaline treatment comprising sodium hydroxide (NaOH), potassium hydroxide (KOH), calcium hydroxide (Ca(OH)$_2$), or any combination thereof. In some cases, the metal strip is cleaned with an alkaline organic compound (i.e., an organic base) treatment. For example, the cleaning process can include an organic base treatment comprising barium tert-butoxide ($C_8H_{18}BaO_2$), choline hydroxide ($C_5H_{15}NO_2$), diethylamine (($C_2H_5)_2NH$), dimethylamine (($CH_3)_2NH$), ethylamine ($C_2H_5NH_2$), methylamine ($CH_3NH_2$), piperidine ($C_5H_{11}N$), and/or combination thereof. This cleaning treatment can reduce and/or remove any aluminum oxide or hydroxide layers on the surface of the aluminum alloy strip.

Optionally, the process can include pre-treating the metal strip with a conversion layer. In some cases, this conversion layer can include compounds of trivalent chromium (Cr(III)) and phosphates. In some cases, this conversion layer can include compounds of titanium and zirconium (Ti—Zr). This optional conversion layer can provide enhanced adhesion, low blushing after pasteurization, and good corrosion performance in an acid test (e.g., an acetic acid test or a citric acid test). In some cases, the metal strip can include one or more optional conversion layers located on an interior-facing side (e.g., product side) and/or an exterior-facing side (e.g., consumer side).

The process can further include applying an adhesion promoter to the metal strip. The adhesion promoter can provide enhanced adhesion in optional downstream coating steps. Adhesion promoters suitable for use in this process are described above. The adhesion promoter can be applied by dip coating, bar coating, roll coating, spin coating, spray coating, screen coating, drop coating, or any other suitable coating technique. If the metal strip is pretreated with a conversion layer, the metal strip pretreated with the conversion layer can be further coated with the adhesion promoter as described above.

Trial and experimentation of various measures taken to promote adhesion of lacquers (i.e., liquid coatings) to aluminum alloy metal strips have shown that such measures are not suitable or effective in reducing feathering associated with polymer films laminated onto aluminum alloy metal strips. It has been found that polymer films require different coating and adhesion measures to control feathering. It has been surprisingly found that enhancing adhesion beyond a level approved by common standard adhesion tests has a substantial effect on feathering. Techniques suitable for producing laminated can end stock having low feathering can include applying a copolymer adhesion promoter to a metal strip, wherein the copolymer promotes adhesion of the polymer film to be laminated onto the metal strip. Optionally, the adhesion promoter allows the polymer film to be applied at a reduced temperature. Applying the polymer film at a reduced temperature allows the polymer film to remain crystalline. A crystalline polymer film can be resistant to feathering.

The process further includes a step of laminating the metal strip coated with the adhesion promoter and optionally pretreated with the conversion layer. The laminating step can include heating a polymer film to a temperature such that the polymer film is soft and tacky, applying the heated polymer film to at least an interior-facing side of the strip, and heating the combined metal strip and polymer film, optionally to an annealing temperature such that the polymer film can be at least partially viscous and wet the side of the strip. In some examples, the polymer film can include polyesters, epoxies, polyurethanes, polyvinyls, polyacrylics, polyamides, polyolefins, and/or silicones.

In some cases, the polymer film laminated to the metal strip can be a biaxially oriented polymer, such as a polyethylene terephthalate (PET) film from a continuous production line. The polymer film can comprise only a main component (e.g., PET layer), or can comprise a main component and one or more supplemental components (e.g., adhesive layers). The polymer film may be rendered amorphous during a heating or annealing process. An amorphous polymer film can have a low resistance to feathering indicating a need for optional processing to reduce feathering.

In some cases, the metal strip and polymer film can be heated to an annealing temperature such that the polymer film can be at least partially viscous and wet the side of the metal strip, which can improve film adhesion sufficiently to provide increased performance. During annealing at temperatures above the melting temperature of the film, the film is allowed to flow into the topography of the metal strip (i.e., wets the metal strip), including any conversion layer(s) and/or adhesion promoters, thus improving adhesion between the metal strip and the film through mechanical bonding, van der Waals forces, polar-polar interactions, or any suitable mechanism initiated by intimate contact between the metal strip, conversion layer, and/or adhesion promoter layer and the polymer film to be laminated onto the metal strip.

In some cases, a metal strip can be laminated on two sides. In other cases, a metal strip can be laminated on one side and lacquered on an opposite side. For example, a metal strip can be laminated on an interior-facing side and lacquered on an exterior-facing side, although other configurations can be used. This hybrid laminated/lacquered metal strip can provide improved functional performance on the interior of the can end stock through use of the polymer film while maintaining high cosmetic performance on the exterior of the can end stock through use of a lacquer, which may not be prone to blushing, such as during pasteurization. In some cases, the polymer film can include additives that provide a slight coloration to the film which does not change during subsequent processing.

In some cases, the laminated metal strip is passed directly from a lamination process into an annealing process (e.g., into an annealing furnace). In some cases, the laminated metal strip is passed directly from a lamination process into a lacquer application system and then into an annealing process (e.g., into an annealing furnace). In some cases, annealing is not performed.

Through trial and experimentation, it has been found that polymer films can provide improved feathering performance when adhesion between the film and metal strip can be controlled. Adhesion can be controlled by controlling the annealing temperature (e.g., higher annealing temperatures can lead to improved adhesion, to a point), substrate properties (e.g., textures, surface energy, and chemistry), and film chemistry. In some cases, controlled application of adhesion promoters, such as a vinyl phosphonic acid-acrylic acid copolymer, onto a metal strip or onto a conversion layer of a metal strip can improve adhesion performance and thus provide improved feathering performance.

In some examples, an adhesion promoter can improve feathering performance on laminated 1xxx series aluminum alloys, 2xxx series aluminum alloys, 3xxx series aluminum alloys, 4xxx series aluminum alloys, 5xxx series aluminum alloys, 6xxx series aluminum alloys, 7xxx series aluminum alloys, and 8xxx series aluminum alloys.

Optionally, the aluminum alloy as described herein can be a 1xxx series aluminum alloy according to one of the following aluminum alloy designations: AA1100, AA1100A, AA1200, AA1200A, AA1300, AA1110, AA1120, AA1230, AA1230A, AA1235, AA1435, AA1145, AA1345, AA1445, AA1150, AA1350, AA1350A, AA1450, AA1370, AA1275, AA1185, AA1285, AA1385, AA1188, AA1190, AA1290, AA1193, AA1198, or AA1199.

Optionally, the aluminum alloy as described herein can be a 2xxx series aluminum alloy according to one of the following aluminum alloy designations: AA2001, A2002, AA2004, AA2005, AA2006, AA2007, AA2007A, AA2007B, AA2008, AA2009, AA2010, AA2011, AA2011A, AA2111, AA2111A, AA2111B, AA2012, AA2013, AA2014, AA2014A, AA2214, AA2015, AA2016, AA2017, AA2017A, AA2117, AA2018, AA2218, AA2618, AA2618A, AA2219, AA2319, AA2419, AA2519, AA2021, AA2022, AA2023, AA2024, AA2024A, AA2124, AA2224, AA2224A, AA2324, AA2424, AA2524, AA2624, AA2724, AA2824, AA2025, AA2026, AA2027, AA2028, AA2028A, AA2028B, AA2028C, AA2029, AA2030, AA2031, AA2032, AA2034, AA2036, AA2037, AA2038, AA2039, AA2139, AA2040, AA2041, AA2044, AA2045, AA2050, AA2055, AA2056, AA2060, AA2065, AA2070, AA2076, AA2090, AA2091, AA2094, AA2095, AA2195, AA2295, AA2196, AA2296, AA2097, AA2197, AA2297, AA2397, AA2098, AA2198, AA2099, or AA2199.

Optionally, the aluminum alloy as described herein can be a 3xxx series aluminum alloy according to one of the following aluminum alloy designations: AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, or AA3065.

Optionally, the aluminum alloy as described herein can be a 4xxx series aluminum alloy according to one of the following aluminum alloy designations: AA4004, AA4104, AA4006, AA4007, AA4008, AA4009, AA4010, AA4013, AA4014, AA4015, AA4015A, AA4115, AA4016, AA4017, AA4018, AA4019, AA4020, AA4021, AA4026, AA4032, AA4043, AA4043A, AA4143, AA4343, AA4643, AA4943, AA4044, AA4045, AA4145, AA4145A, AA4046, AA4047, AA4047A, or AA4147.

Optionally, the aluminum alloy as described herein can be a 5xxx series aluminum alloy according to one of the following aluminum alloy designations: AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, or AA5088.

Optionally, the aluminum alloy as described herein can be a 6xxx series aluminum alloy according to one of the following aluminum alloy designations: AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, or AA6092.

Optionally, the aluminum alloy as described herein can be a 7xxx series aluminum alloy according to one of the following aluminum alloy designations: AA7011, AA7019, AA7020, AA7021, AA7039, AA7072, AA7075, AA7085, AA7108, AA7108A, AA7015, AA7017, AA7018, AA7019A, AA7024, AA7025, AA7028, AA7030, AA7031, AA7033, AA7035, AA7035A, AA7046, AA7046A, AA7003, AA7004, AA7005, AA7009, AA7010, AA7011, AA7012, AA7014, AA7016, AA7116, AA7122, AA7023, AA7026, AA7029, AA7129, AA7229, AA7032, AA7033, AA7034, AA7036, AA7136, AA7037, AA7040, AA7140, AA7041, AA7049, AA7049A, AA7149, AA7249, AA7349, AA7449, AA7050, AA7050A, AA7150, AA7250, AA7055, AA7155, AA7255, AA7056, AA7060, AA7064, AA7065, AA7068, AA7168, AA7175, AA7475, AA7076, AA7178, AA7278, AA7278A, AA7081, AA7181, AA7185, AA7090, AA7093, AA7095, or AA7099.

Optionally, the aluminum alloy as described herein can be an 8xxx series aluminum alloy according to one of the following aluminum alloy designations: AA8005, AA8006, AA8007, AA8008, AA8010, AA8011, AA8011A, AA8111, AA8211, AA8112, AA8014, AA8015, AA8016, AA8017, AA8018, AA8019, AA8021, AA8021A, AA8021B, AA8022, AA8023, AA8024, AA8025, AA8026, AA8030, AA8130, AA8040, AA8050, AA8150, AA8076, AA8076A, AA8176, AA8077, AA8177, AA8079, AA8090, AA8091, or AA8093.

In some cases, the aspects and features of the present disclosure are especially useful with 5xxx series aluminum alloys, such as for example AA5182. In some cases, the aspects and features of the present disclosure are especially useful with 3xxx series aluminum alloys, such as for example AA3104 (e.g., aluminum can body stock), although other types of aluminum or other metals can be used. In some examples, the aluminum alloy is a monolithic alloy. In some examples, the aluminum alloy is a clad aluminum alloy, having a core layer and one or two cladding layers. In some cases, the core layer may be different from one or both of the cladding layers.

While aluminum alloy articles are described throughout the text, the methods and articles apply to any metal. In some examples, the metal article is aluminum, an aluminum alloy, magnesium, a magnesium-based material, titanium, a titanium-based material, copper, a copper-based material, steel, a steel-based material, bronze, a bronze-based material, brass, a brass-based material, a composite, a sheet used in composites, or any other suitable metal or combination of materials. The article may include monolithic materials, as well as non-monolithic materials such as roll-bonded materials, clad materials, composite materials, or various other materials. In some examples, the metal article is a metal coil, a metal strip, a metal plate, a metal sheet, a metal billet, a metal ingot, or the like.

An exemplary lamination system can include a pair of rollers through which a pre-heated metal strip may pass. The pre-heated metal strip may be pre-heated by a pre-heating furnace. As discussed above, the pre-heated metal strip can include one or more conversion layers and one or more copolymer adhesion promoter layers.

When passing through the rollers, a polymer film can be pressed against the pre-heated metal strip to produce a laminated metal strip. In some cases, a single lamination system can include additional sets of rollers to apply a second polymer film to an opposite side of the pre-heated metal strip from the first polymer film.

The methods and products described herein can be used for preparing beverage and food containers (e.g., cans) or any other desired application. In some examples, the methods and products can be used to prepare beverage can bodies. In some examples, the methods and products can be used in architectural applications, in construction application, or any other suitable application.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram of a system 100 for preparing can end stock (CES) according to certain aspects of the present disclosure. A metal strip 102 is passed through a strip cleaner 112 that cleans the strip and removes or reduces any metal oxide layer (i.e., any surface area of the metal strip that has reacted with oxygen in air to form a metal oxide on the surface area) or metal hydroxide layer (i.e., any surface area of the metal strip that has reacted with moisture in air to form a metal hydroxide on the surface area) on the surface of the metal strip 102. The strip cleaner 112 can include a supply of acid (e.g., sulfuric acid and/or hydrofluoric acid) that can be introduced to one or more surfaces of the metal strip 102, such as through spray nozzles, dipping, or other techniques. After passing through the strip cleaner 112, the metal strip 102 can be a cleaned metal strip 104. The cleaned metal strip 104 may contain no or low amounts of metal oxides or hydroxides on one or more surfaces (e.g., a surface to be laminated). Low amounts of metal oxides or hydroxides include any metal oxides or hydroxides that can form a metal oxide or hydroxide layer on the cleaned metal strip 104 after cleaning and before any downstream process. For example, the metal oxide or hydroxide layer can be less than 5 nanometers (nm) thick, less than 4 nm thick, less than 3 nm thick, less than 2 nm thick, less than 1 nm thick, or less than 0.5 nm thick. In some examples, metal oxides or hydroxides are not present on the surface to be laminated.

The cleaned metal strip 104 can optionally pass through a conversion layer applicator 114. The conversion layer applicator 114 can pre-treat the metal strip with a conversion layer. In some cases, as mentioned above, this conversion layer can include compounds of trivalent chromium (Cr(III)) and phosphates. In some cases, this conversion layer can include compounds of titanium and zirconium (Ti—Zr). In some examples, the metal strip is heated to a temperature of from about 80° C. to about 120° C. after the conversion layer is applied. For example, the metal strip can be heated to about 90° C., about 100° C., or about 110° C. Any suitable technique for applying a conversion layer can be used by the conversion layer applicator 114, such as applying conversion solutions (e.g., via spray nozzle, dipping, or other techniques) based on desired parameters (e.g., for desired amounts of times, at desired temperatures, at desired thicknesses, and/or with desired amounts of drying time). The cleaned metal strip 104 exiting the conversion layer applicator 114 may be a metal strip with an optional conversion layer 106.

The metal strip with an optional conversion layer 106 can enter an adhesion promoter applicator 116. The adhesion promoter applicator 116 can apply an adhesion promoter, such as a vinyl phosphonic acid-acrylic acid copolymer, to one or more sides of the cleaned metal strip 104 or the metal strip with an optional conversion layer 106 (e.g., the adhesion promoter applicator 116 can include any suitable equipment for introducing the adhesion promoter to a metal strip 102, such as spray nozzles, dipping equipment, or the like). The adhesion promoter applicator 116 can control any suitable parameters of introducing the adhesion promoter to the cleaned metal strip 104 or the metal strip with an optional conversion layer 106, such as amounts applied, application time, application thickness (e.g., from about 3.0 μm to about 6.0 μm, for example about 4.57 μm), drying time (e.g., up to about 30 seconds, for example for about 20 seconds, using any suitable drying method, such as a convection dryer or drying at room temperature), application temperature, or other such parameters. The cleaned metal strip 104 or the metal strip with an optional conversion layer 106 exiting the adhesion promoter applicator 116 can be a metal strip coated with an adhesion promoter 108. In some cases, the metal strip coated with the adhesion promoter 108 can have an adhesion promoter layer on at least one surface of the cleaned metal strip 104 or the metal strip with an optional conversion layer 106. In certain examples, the entire cleaned metal strip 104 or the entire metal strip with an optional conversion layer 106 is coated with the adhesion promoter. The metal strip coated with the adhesion promoter 108 is dried prior to lamination.

The metal strip coated with the adhesion promoter 108 can pass into a lamination system 118. Lamination system 118 can be any suitable system for laminating a polymer film 126 to a metal strip 102. The metal strip coated with the adhesion promoter 108 is passed through a lamination system 118 that applies a polymer film 126 to at least one side of the metal strip coated with the adhesion promoter 108 (e.g., a side having the adhesion promoter). In some cases, a polymer film can be applied to both sides of the metal strip coated with the adhesion promoter 108. In some examples, the metal strip is heated to a temperature of from about 200° C. to about 280° C. before the polymer film is applied (e.g., from 205° C. to 275° C., from 210° C. to 260° C., from 215° C. to 280° C., from 220° C. to 279° C., from 225° C. to 275° C., or from 230° C. to 280° C.). For example, the metal strip can be heated to about 200° C., about 201° C., about 202° C., about 203° C., about 204° C., about 205° C., about 206° C., about 207° C., about 208° C., about 209° C., about 210° C., about 211° C., about 212° C., about 213° C., about 214° C., about 215° C., about 216° C., about 217° C., about 218° C., about 219° C., about 220° C., about 221° C., about 222° C., about 223° C., about 224° C., about 225° C., about 226° C., about 227° C., about 228° C., about 229° C., about 240° C., about 235° C., or about 254° C. For example, the metal strip can be heated to about 230° C., about 231° C., about 232° C., about 233° C., about 234° C., about 235° C., about 236° C., about 237° C., about 238° C., about 239° C., about 240° C., about 241° C., about 242° C., about 243° C., about 244° C., about 245° C., about 246° C., about 247° C., about 248° C., about 249° C., about 250° C., about 251° C., about 252° C., about 253° C., about 254° C., about 255° C., about 256° C., about 257° C., about 258° C., about 259° C., about 260° C., about 261° C., about 262° C., about 263° C., about 264° C., about 265° C., about 266° C., about 267° C., about 268° C., about 269° C., about 270° C., about 271° C., about 272° C., about 273° C., about 274° C., about 275° C., about 276° C., about 277° C., about 278° C., about 279° C., or about 280° C. A laminated metal strip 110 exits the lamination system 118.

In some cases, the laminated metal strip 110 can pass into an optional lacquer application system 120. Lacquer 124 is applied to the laminated metal strip 110 by the lacquer application system 120. Lacquer application system 120 can be any suitable system for applying lacquer 124 to a metal strip 102. A lacquer application system 120 can include an oven for heating or curing the lacquer 124 onto the laminated metal strip 110. In some cases and as shown in FIG. 1, the lacquer application system 120 is downstream of (e.g., after) the lamination system 118. In some cases, the lacquer application system 120 is upstream of the lamination system 118 or the adhesion promoter applicator 116. A laminated, lacquered metal strip 122 can exit the lacquer application system 120.

Figure 2:
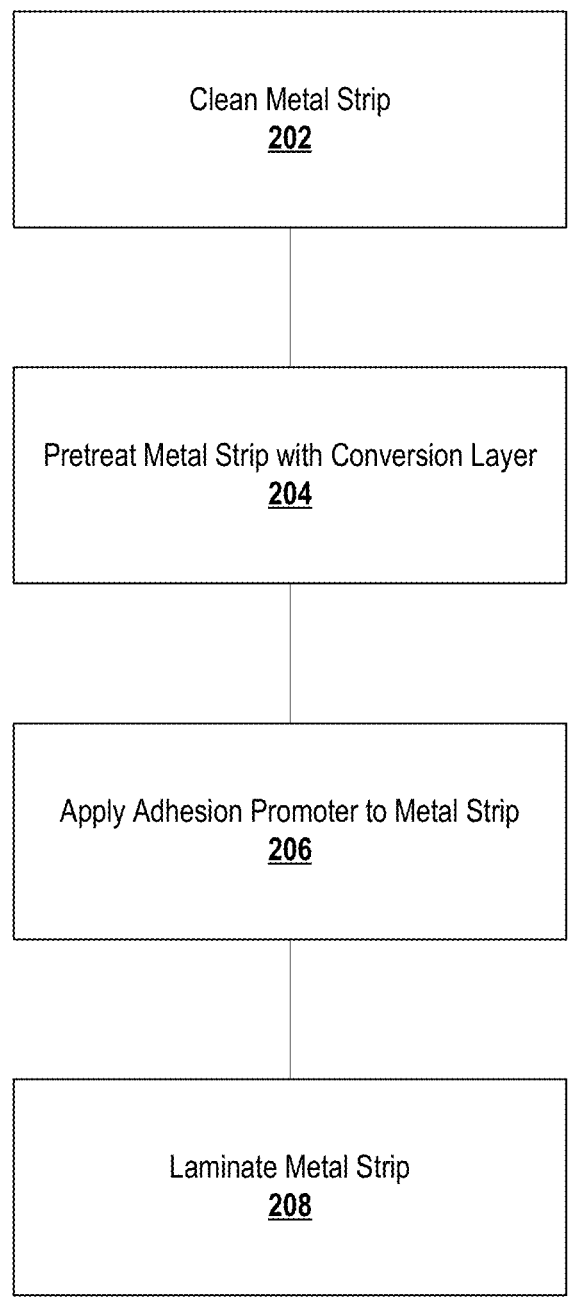
FIG. 2 is a flowchart depicting a process for laminating a metal strip according to certain aspects of the present disclosure.

FIG. 2 is a flowchart depicting a process 200 for producing a laminated metal strip. At block 202, the metal strip can be cleaned. Cleaning the metal strip can include acid treating the metal strip, such as with sulfuric or hydrofluoric acid. Cleaning the metal strip can include partially or completely reducing and/or removing any aluminum oxide or hydroxide layer from the surface of the metal strip (e.g., metal strip).

At block 204, the metal strip can be pretreated with a conversion layer. Pre-treating the metal strip at block 204 can include introducing to the metal strip a conversion solution designed to create a conversion layer having compounds of trivalent chromium (Cr(III)) and phosphates or to create a conversion layer having compounds of titanium and zirconium (Ti—Zr).

At block 206, an adhesion promoter can be applied to the metal strip. In some cases, application of the adhesion promoter can include introducing the adhesion promoter to a cleaned surface of the metal strip (e.g., a surface having low or no metal oxides). In some cases, application of the adhesion promoter can include introducing an adhesion promoter layer to a conversion layer of the metal strip. The adhesion promoter can be any suitable adhesion promoter, such as a copolymer (e.g., a vinyl phosphonic acid-acrylic acid copolymer) as set forth above.

At block 208, the metal strip can be laminated, such as with a polymer film such as a PET film. In some aspects, the polymer film can comprise at least one polyamide, for example, nylon 12. Lamination can include applying the polymer film to a surface of the metal strip that was coated with an adhesion promoter at block 206.

Traditional laminated metal strips often scored poorly on a 3% acetic acid test. However, the polymer films prepared according to the techniques described herein perform better on a 3% acetic acid test. As used herein, a 3% acetic acid test can include assessing the resistance of a coating against diluted acidic media at approximately 100° C. for 30 minutes. The test can include cutting crosshatched markings into samples with a scalpel. Cuts can be spaced about 3 mm apart and align substantially parallel to rolling lines visible in the laminated metal strips. Crosshatch cuts can be spaced about 3 mm apart and align substantially perpendicular to rolling lines visible in the laminated metal strips. In some further examples, the samples are further subjected to an additional cross cut adhesion test wherein the cuts are spaced about 1 mm apart. A multi-blade cutting tool can be used to create a crosshatch cut with about 1 mm spacing between hatches. The test can further include placing the samples into a 3% acetic acid solution at approximately 100° C. for 30 minutes, after which the samples are removed from the 3% acetic acid solution, cooled down with demineralized water, and dried with a tissue. After cooling and drying, adhesive tape is placed over the crosshatched regions and steadily removed in 0.5 to 1 second at an angle of approximately 90°. A 10× magnifying glass is used to evaluate loss of coating along the cut edges and full squares. The results of the test (e.g., based on the presence of and intensity of delamination) can be used to determine if the laminated metal strip is acceptable or unacceptable given the desired specifications. In some cases, the laminated can end stock disclosed herein passes 3% acetic acid tests without delamination. In some cases, the laminated can end stock disclosed herein obtains more favorable results in the 3% acetic acid tests (e.g., low or no delamination) than a standard, lacquered can end stock.

As described herein, a standard feathering test for a can end may include immersing a can end in a bath of deionized water at approximately 75° C. for thirty minutes, rinsing the can end in cool deionized water to return the can end to room temperature, and then immediately opening the scored orifice of the can end. Feathering can be observed and measured on the scored panel or pour hole opening. In some cases, a feathering test can be conducted on a flat sheet of metal (referred to herein as a "tear-and-peel" test), such as a flat sheet of can end stock. In such cases, the tear-and-peel test can include immersing the sample in demineralized water at 80° C. for forty minutes, after which the sample is allowed to cool down to room temperature and the sample can be cut and a strip of metal can be separated by pulling the strip in a direction away from the cut. Other feathering tests can be used.

Figure 3:
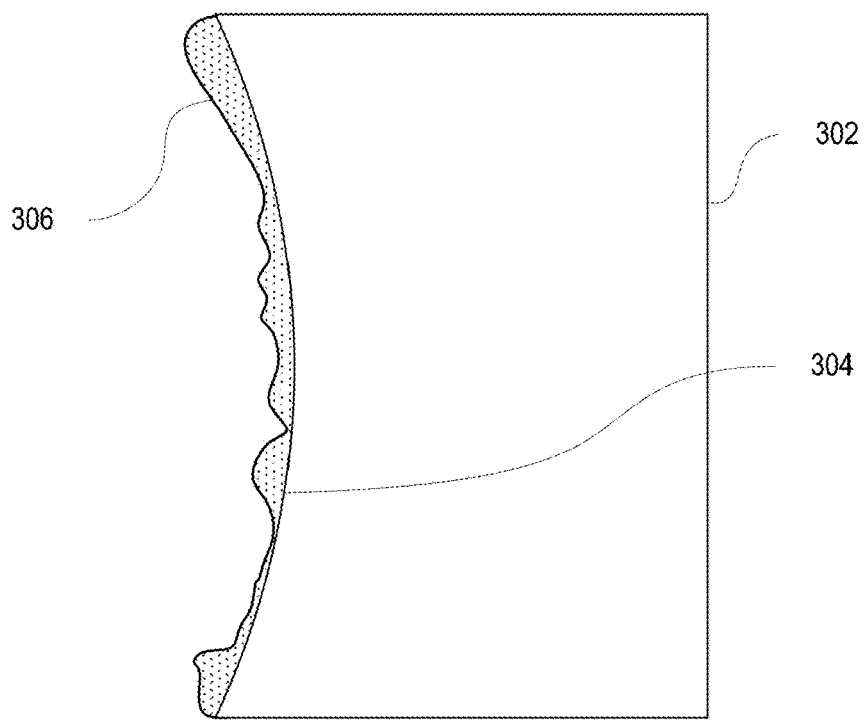
FIG. 3 is a partial top view depicting a portion of the opening of a can end exhibiting feathering.

FIG. 3 is a partial top view depicting a piece of can end stock 302. The can end stock 302 includes a layer of polymer film 306 that has not been annealed. The can end stock 302 has been separated along a score line 304. The polymer film 306 can be seen feathering out past the score line 304. The can end stock 302 of FIG. 3 can be considered to have poor feathering.

Figure 4:
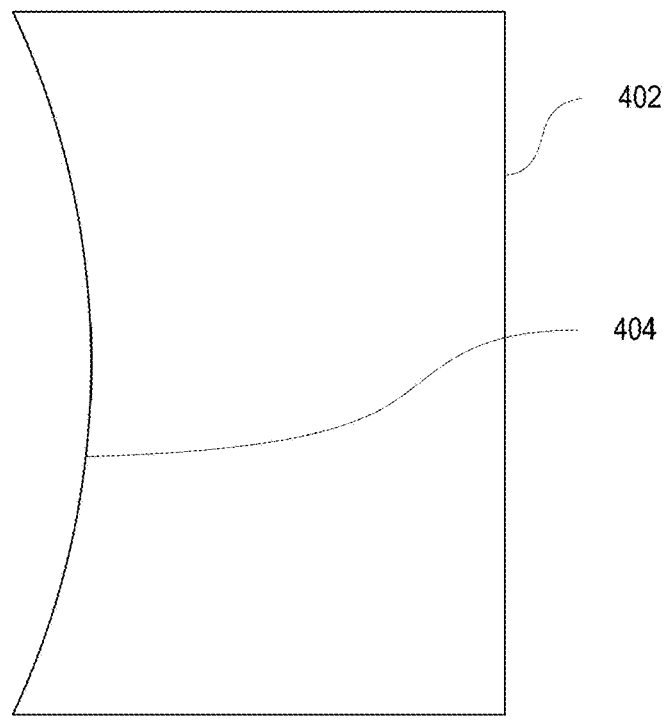
FIG. 4 is a partial top view depicting a portion of the opening of a can end exhibiting no feathering according to certain aspects of the present disclosure.

FIG. 4 is a partial top view depicting a piece of can end stock 402 according to certain aspects of the present disclosure. The can end stock 402 includes a layer of polymer film that has been applied to a metal surface coated with an adhesion promoter according to certain aspects of the present disclosure, such as the laminated metal strip 110 of FIG. 1. The can end stock 402 has been separated along a score line 404. The polymer film has not feathered out past the score line 404. The can end stock 402 of FIG. 4 can be considered to have good feathering (e.g., feathering of less than 0.8 mm, less than 0.7 mm, less than 0.6 mm, less than 0.5 mm, less than 0.4 mm, less than 0.3 mm, less than 0.2 mm, or less than 0.1 mm) or no feathering.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention.

EXAMPLES

Feathering describes the formation of loose polymer feathers which extend over the edge of the aluminum forming the orifice when a beverage can is opened, and are therefore visible to the consumer. Such feathers are undesirable as they might detach and contaminate the beverage and because a consumer understands feathering as an indication of poor quality. FIG. 3 depicts an example of undesirable feathering, whereas FIG. 4 depicts an example of desirable feathering. Using flat sheet can end stock (CES), feathering was induced by manually tearing the laminated aluminum using pliers and measuring the loose feathers from the PET film extending over the edge of the torn aluminum (referred to as a "tear-and-peel" test). Tear-and-peel tests were additionally performed on laminated panels which were subjected to a pasteurization procedure in demineralized water to simulate the potential impact of aqueous beverages.

An analysis of the resistance of the can end stock to food simulants is important because the coated aluminum alloy can be used in cans for various purposes, such as conveying various beverages. The adhesion of the coating was tested after storage in the various acids and water under the following conditions:
  (i) Citric acid/acid retort: 2 wt. % aqueous solution, 30 minutes at 121° C.;
  (ii) Acetic acid: 3 vol. % aqueous solution, 30 minutes at 100° C.; and
  (iii) Pasteurization: 40 minutes at 80° C. in deionized water.

A cross-cut test was performed to provide an assessment of the resistance of coatings to separation from a substrate. The test procedure was to create a cross cut through the coating using a multi-cutting tool with blades spaced 1 mm apart to obtain an about 1 mm by 1 mm square pattern (see FIGS. 5-7) aligned 45° to rolling lines visible in the substrate. Adhesion of the coating was evaluated by removing any delaminated coating using adhesive tape. The evaluation and classification of the standard test results are described in Table 1.

TABLE 1

Figure 5:
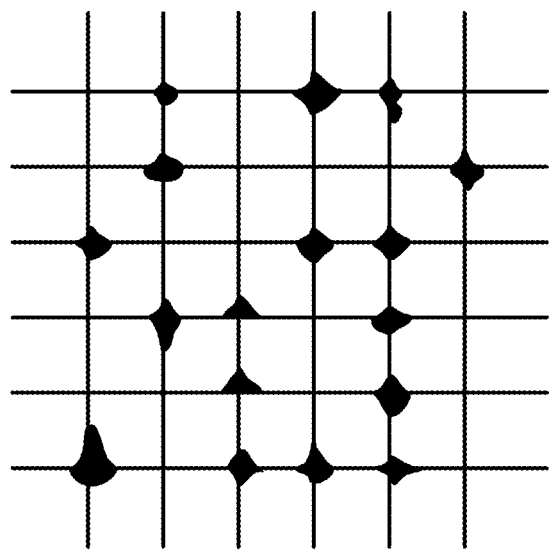
FIG. 5 is a schematic of a cross-cut pattern used herein to assess adhesion of a polymer film to metal and/or metal oxide strips, showing less than 5% of the polymer film detached.
Figure 6:
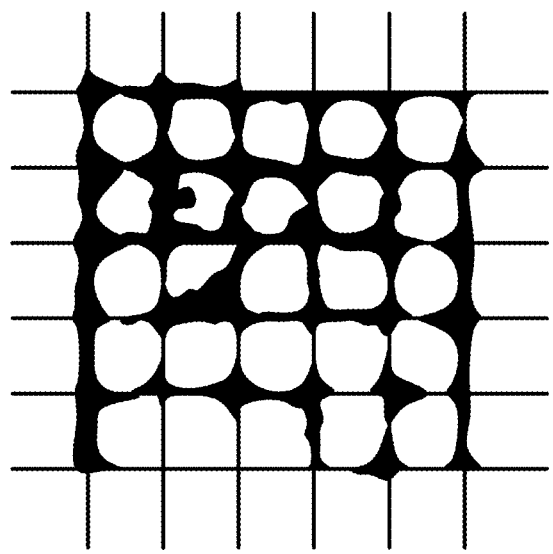
FIG. 6 is a schematic of a cross-cut pattern used herein to assess adhesion of a polymer film to metal and/or metal oxide strips, showing at least 5% to less than 15% of the polymer film detached, with no loss of a full square.
Figure 7:
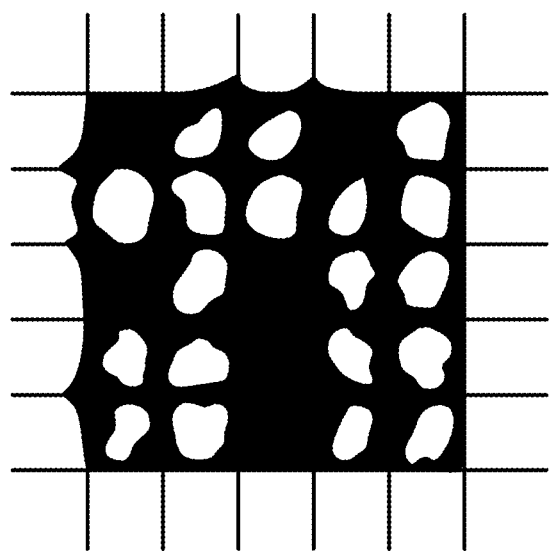
FIG. 7 is a schematic of a cross-cut pattern used herein to assess adhesion of a polymer film to metal and/or metal oxide strips, showing at least 15% to less than 65% of the polymer film detached, with loss of at least a full square.

| Cross-cut Rating | Description | Appearance | Grade |
| --- | --- | --- | --- |
| 1 | No loss of coating | Not shown | Pass |
| 2 | Loss of less than 5% of coating | FIG. 5 | Pass |
| 3 | Loss of at least 5% to less than 15% of coating with no loss of a full square | FIG. 6 | Borderline |
| 4 | Loss of at least 15% up to 65% of coating, or loss of at least a full square | FIG. 7* | Fail |
| 5 | Loss of greater than 65% of coating | Not shown | Fail |

*FIG. 7 illustrates from about 35% up to 65% loss.

Example 1

Figure 8:
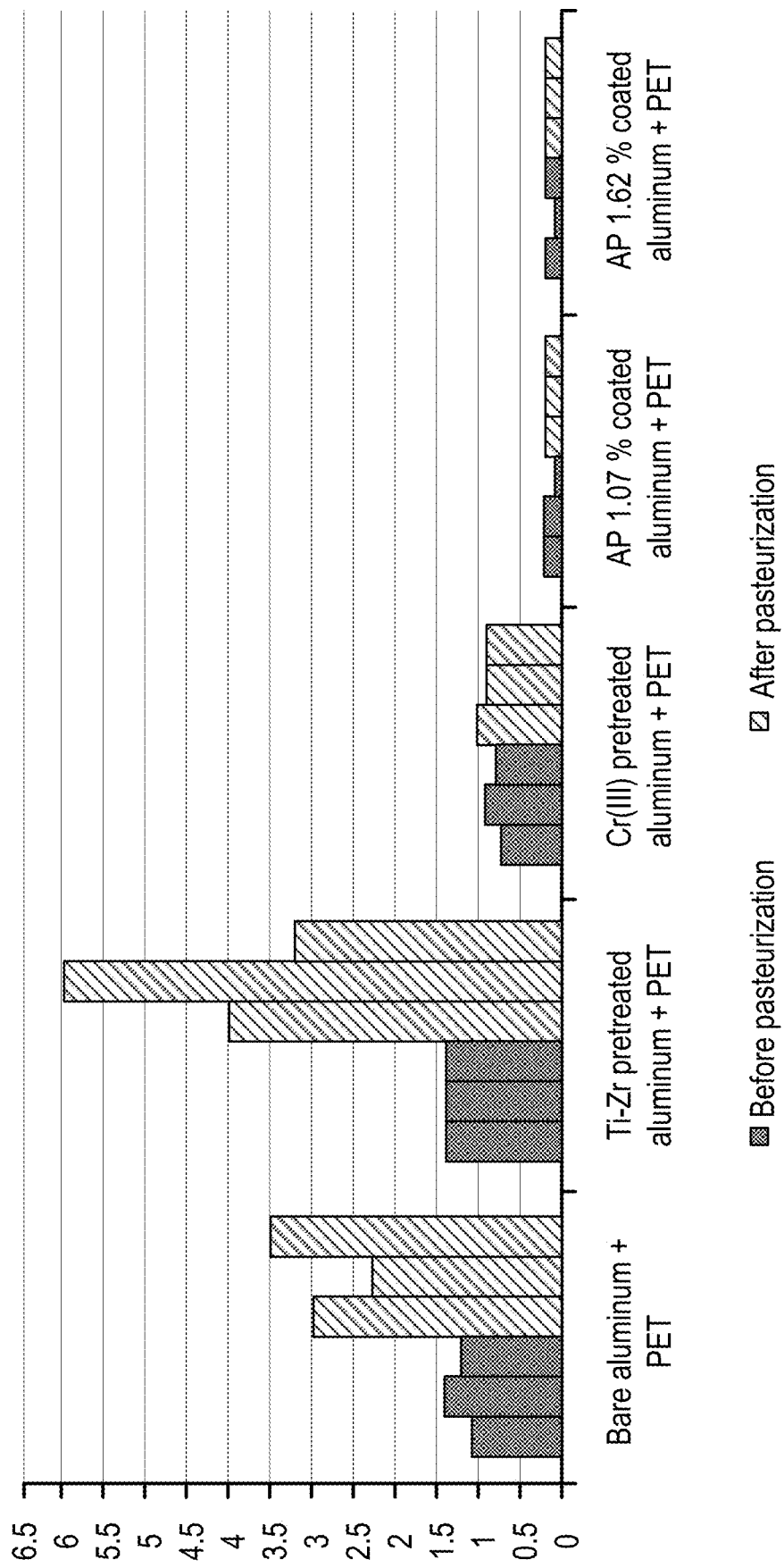
FIG. 8 is a graph showing the results of a tear-and-peel test of an aluminum alloy strip laminated with poly(ethylene terephthalate) (PET), an aluminum alloy strip pretreated with Ti—Zr and laminated with PET, an aluminum alloy strip pretreated with Cr(III) and laminated with PET, and an aluminum alloy strip coated with various amounts of an adhesion promoter and laminated with PET. Pre-treatments in this example were applied via roller coating. Samples were tested before pasteurization (left three histograms in each group) and after pasteurization (right three histograms in each group).

FIG. 8 presents the tear-and-peel test results of an aluminum alloy strip laminated with PET (referred to in FIG. 8 as "Bare aluminum+PET"), an aluminum alloy strip pretreated with Ti—Zr (Alodine® 802N, Henkel AG & Co. KGaA, Dusseldorf, Germany) and laminated with PET (referred to in FIG. 8 as "Ti—Zr pretreated aluminum+PET"), an aluminum alloy strip pretreated with Cr(III) (Alodine® 6207) and laminated with PET (referred to in FIG. 8 as "Cr(III) pretreated aluminum+PET"), and aluminum alloy strips coated with two different concentrations of an adhesion promoter (1.07%, (referred to in FIG. 8 as "AP 1.07% coated aluminum+PET"), and 1.62%, respectively (referred to in FIG. 8 as "AP 1.62% coated aluminum+PET")) and laminated with PET. Conversion layer pre-treatments in this example were applied via a roll coater in a commercial production line. Adhesion promoters in this example were applied via a bar coater on select samples. Samples were tested before pasteurization (left set of bars in each set) and after pasteurization (right set of bars in each set). Evident in the graph is the reduction of feathering when the adhesion promoter (referred to as "AP") is incorporated in the lamination architecture. Feathering was reduced to less than 0.5 mm when the adhesion of the PET film was enhanced by the adhesion promoter. In some cases, feathering was reduced one full order of magnitude. Overall, incorporating an adhesion promoter into lamination architecture significantly reduced feathering of the laminated film through improved adhesion of the laminated film to the metal strip.

The adhesion promoter solution was prepared as follows. A solution of poly(vinyl phosphonic acid-co-acrylic acid) (p(VPA-AA)) was diluted with denatured ethanol (EtOH) to a concentration of from about 0.15 wt. % to about 5.07 wt. %. For example, the copolymer solution can be diluted with EtOH to a concentration of 1.07%, 1.62%, 0.3%, or 2.78%, all in weight percent. For example, the copolymer solution can be diluted with EtOH to a concentration of 0.15%, 0.25%, 0.35%, 0.45%, 0.55%, 0.65%, 0.75%, 0.85%, 0.95%, 1.05%, 1.15%, 1.25%, 1.35%, 1.45%, 1.55%, 1.65%, 1.75%, 1.85%, 1.95%, 2.05%, 2.15%, 2.25%, 2.35%, 2.45%, 2.55%, 2.65%, 2.75%, 2.85%, 2.95%, 3.05%, 3.15%, 3.25%, 3.35%, 3.45%, 3.55%, 3.65%, 3.75%, 3.85%, 3.95%, 4.05%, 4.15%, 4.25%, 4.35%, 4.45%, 4.55%, 4.65%, 4.75%, 4.85%, 4.95%, 5.05%, or 5.07%, all in weight percent. In FIG. 8, an aluminum alloy strip was coated with a p(VPA-AA) solution that was diluted with EtOH to a concentration of 1.07% and laminated with PET, and another aluminum alloy strip was coated with a p(VPA-AA) solution that was diluted with EtOH to a concentration of 1.62 wt. % and laminated with PET. The dilute copolymer solution was stirred for 5 minutes.

Example 2

Various laboratory coating methods were employed to apply the adhesion promoter, including a dip coating, a bar coating and a roll coating as described below.

Dip coating was performed by immersing a substrate into an adhesion promoter solution for a duration of time. The substrate was removed from the adhesion promoter solution and a wet film was created on the substrate surface. The film was dried leaving the adhesion promoter film.

Bar coating was performed by using a wire-wound bar to apply a coating on the substrate. The coating thickness was determined by the wire gauge and winding tightness. An amount of the adhesion promoter solution was dropped on the substrate and the bar was dragged over the solution creating a wet film. The wet film was dried leaving the adhesion promoter film. Application of the adhesion promoter solution was performed by bar coating to a nominal wet film thickness of 4.57 µm. The film was dried 20 seconds under ambient conditions. Drying the film at ambient conditions can include drying the film at room temperature or without additional heat. The sample coated with the adhesion promoter was laminated with PET according to methods described herein, with a roll temperature of 200° C. The aluminum alloy strip was annealed in a belt oven at 250° C. peak metal temperature (PMT) for 20 seconds.

Roll coating was performed by passing a substrate over a roll soaked with the adhesion promoter solution creating a wet film on the substrate. The wet adhesion promoter film was dried providing a dry adhesion promoter film. The sample coated with the adhesion promoter was laminated with PET according to methods described herein, with a roll temperature of 200° C. The laminated aluminum alloy strip was annealed in a belt oven at 250° C. PMT for 20 seconds.

Figure 9:
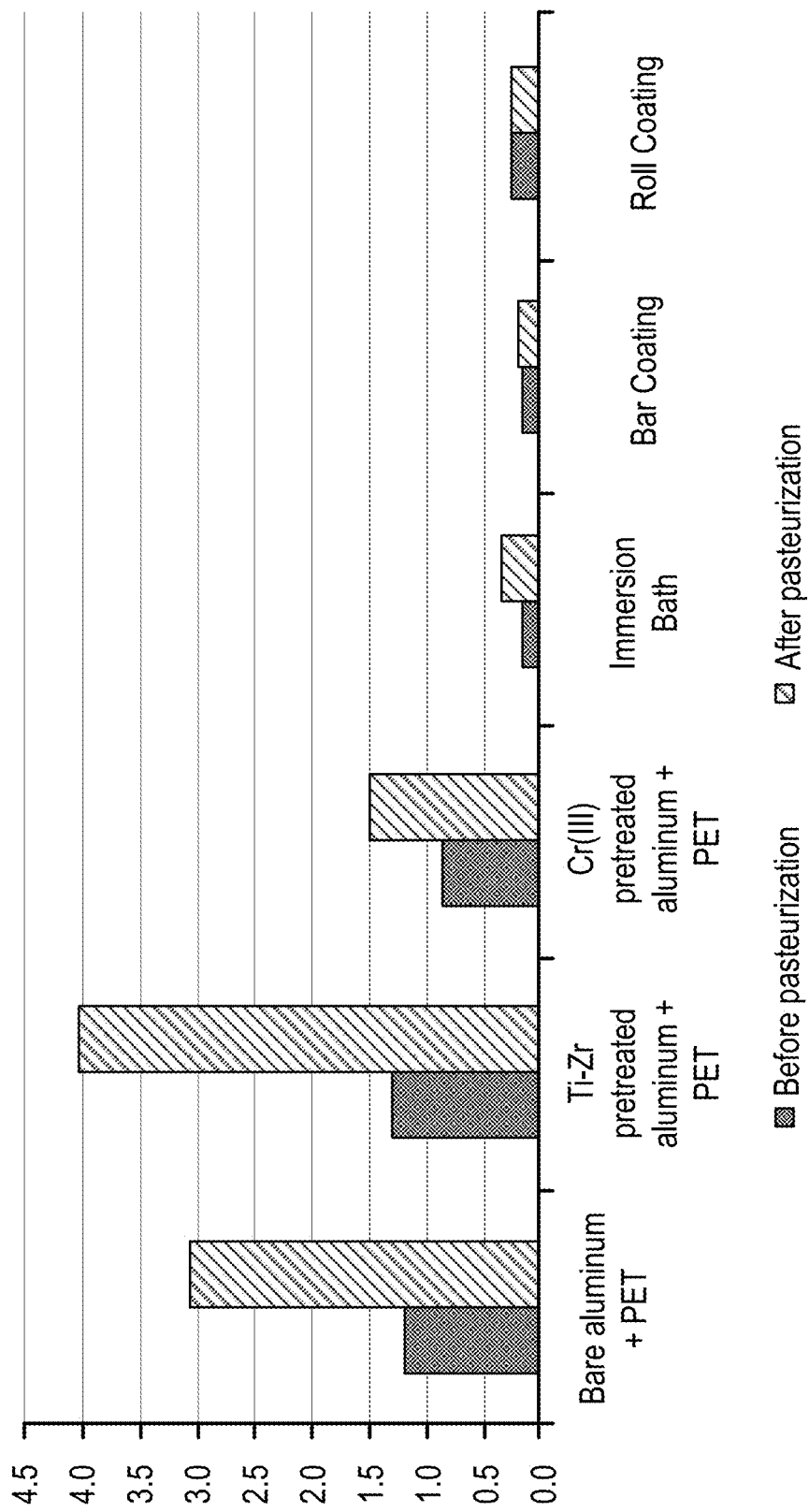
FIG. 9 is a graph showing the results of a tear-and-peel test of an aluminum alloy strip laminated with PET, an aluminum alloy strip pretreated with Ti—Zr and laminated with PET, an aluminum alloy strip pretreated with Cr(III) and laminated with PET, and an aluminum alloy strip coated with an adhesion promoter and laminated with PET. The adhesion promoter in this example was applied via dip coating, bar coating and roll coating. Samples were tested before pasteurization (left histogram in each pair) and after pasteurization (right histogram in each pair).

FIG. 9 presents the tear-and-peel test results of an aluminum alloy strip laminated with PET (referred to as Bare aluminum+PET in FIG. 9), an aluminum alloy strip pretreated with Ti—Zr and laminated with PET (referred to in FIG. 9 as "Ti—Zr pretreated aluminum+PET"), an aluminum alloy strip pretreated with Cr(III) and laminated with PET (referred to in FIG. 9 as "Cr(III) pretreated aluminum+PET"), and aluminum alloy strips coated with an adhesion promoter and laminated with PET (these samples are labeled in FIG. 9 as "Immersion Bath," "Bar Coating," and "Roll Coating"). The adhesion promoter in this example was applied to one sample via dip coating (referred to in FIG. 9 as "Immersion Bath"), to another sample via bar coating (referred to in FIG. 9 as "Bar Coating"), and to another sample via roll coating (referred to in FIG. 9 as "Roll Coating"). The concentration of the adhesion promoter in the solution was varied with application method to accomplish similar coating weights on metal strip samples after drying. Samples were tested before pasteurization (left set of bars in each set) and after pasteurization (right set of bars in each set). Evident in the graph is the reduction of feathering when the adhesion promoter is incorporated in the lamination architecture. Feathering was reduced to less than 0.5 mm when the adhesion of the PET film was enhanced by the adhesion promoter. In some cases, feathering was reduced by a full order of magnitude when an adhesion promoter was incorporated in the lamination architecture. Improved adhesion of the laminated film to the metal strip provided a significant reduction in feathering. Additionally, it was evident the reduced feathering due to improved adhesion of the laminated film to the metal strip was accomplished regardless of method used to apply the adhesion promoter.

Tables 2-11 summarize results of various coating architectures exposed to various test conditions. All samples were ultimately laminated with a PET film. In the following examples, pre-lamination treatments included no pre-treatment (i.e., bare aluminum); Ti—Zr; Cr(III); poly(vinyl phosphonic acid-co-acrylic acid) (p(VPA-AA)) adhesion promoter in various concentrations in ethanol (EtOH); Ti—Zr and p(VPA-AA); and Cr(III) and p(VPA-AA). The p(VPA-AA) adhesion promoter was coated via bar coating, dip coating and roll coating, the parameters of which are set forth above.

Results of various samples incorporating an adhesion promoter applied via bar coating as compared with untreated samples laminated with PET, samples pretreated with Ti—Zr and laminated with PET, and samples pretreated with Cr(III) and laminated with PET are summarized in Tables 2-5.

Figure 10:
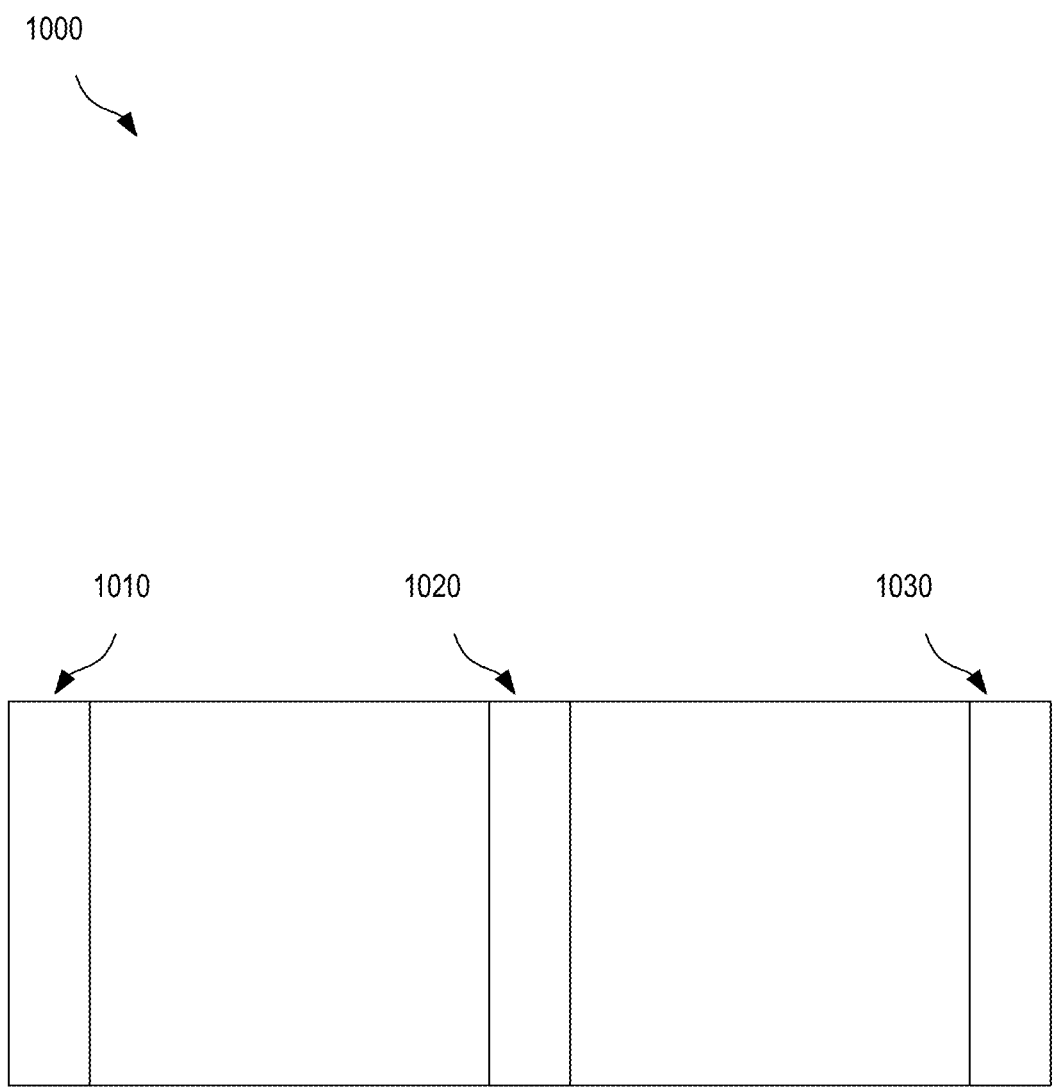
FIG. 10 is an illustration of an aluminum alloy sheet depicting the three positions (left, middle, and right) tested in the cross-cut and feathering tests.

Table 2 presents the results of the citric acid test, the parameters of which are set forth above. Cross-cut ratings for the 3 mm cross-cut test, as described above, include: "delamination," which indicates the loss of any full square from the square pattern; "slight delamination," which indicates any less severe detachment of the coating; "no delamination," which indicates no loss of coating, and "corrosion creep," which indicates the amount of corrosion extending away from the cut. Cross-cut ratings for the 1 mm cross-cut test are defined above in Table 1. The cross-cut test was performed on three samples across the width of the sheet 1000, in the left 1010, middle 1020, and right 1030 positions as shown in FIG. 10.

TABLE 2

Citric Acid Test

| Sample Pre-Treatment/Coating | Cross-cut before (3 mm) | | | Cross-cut after (1 mm) | | |
| --- | --- | --- | --- | --- | --- | --- |
| | Left | Middle | Right | Left | Middle | Right |
| Untreated (bare aluminum)/PET laminated | Delamination | Delamination | Delamination | 2 | 2 | 2 |
| Ti—Zr/PET laminated | Delamination | Delamination/ Corrosion Creep: 1.1 mm | Delamination/ Corrosion creep: 1.3 mm | 3 | 3 | 4 |
| Cr(III)/PET laminated | Delamination | Delamination | Delamination | 3 | 3 | 5 |
| Ti—Zr + p(VPA-AA)/PET laminated | No delamination | No delamination | No delamination | 1 | 1 | 1 |
| Cr(III) + p(VPA-AA)/PET laminated | No delamination | No delamination | No delamination | 1-2 | 1 | 1 |
| p(VPA-AA) (2.68%)/PET laminated | No delamination | No delamination | No delamination | 1 | 1 | 1 |
| p(VPA-AA) (4.05%)/PET laminated | No delamination | No delamination | No delamination | 1 | 1 | 1 |

Table 3 presents the cross-cut results of the acetic acid test, the parameters of which are set forth above.

TABLE 3

Acetic Acid Test

| Sample Pre-Treatment/Coating | Cross-cut before (3 mm) | | | Cross-cut after (1 mm) | | |
|---|---|---|---|---|---|---|
| | Left | Middle | Right | Left | Middle | Right |
| Untreated/PET laminated | Delamination | Delamination | Delamination | 5 | 5 | 5 |
| Ti—Zr/PET laminated | Delamination | Delamination | Delamination | 5 | 5 | 5 |
| Cr(III)/PET laminated | Slight delamination | No delamination | Slight delamination | 1 | 1 | 1-2 |
| Ti—Zr + p(VPA-AA)/PET laminated | No delamination | No delamination | No delamination | 1 | 1 | 1 |
| Cr(III) + p(VPA-AA)/PET laminated | No delamination | No delamination | No delamination | 2 | 2 | 1-2 |
| p(VPA-AA) (2.68%)/PET laminated | No delamination | No delamination | No delamination | 1 | 1 | 1 |
| p(VPA-AA) (4.05%)/PET laminated | No delamination | No delamination | No delamination | 1 | 1 | 1 |

Table 4 presents the cross-cut and feathering results (e.g., the length of the polymer film that was delaminated from the sample) before pasteurization. The cross-cut and feathering tests were performed on three samples across the width of the sheet 1000, in the left 1010, middle 1020, and right 1030 positions as shown in FIG. 10.

TABLE 4

Pre-Pasteurization Feathering Results

| Sample Pre-Treatment/Coating | Cross-cut (1 mm) | | | Feathering (mm) | | |
|---|---|---|---|---|---|---|
| | Left | Middle | Right | Left | Middle | Right |
| Untreated/PET laminated | 3 | 3 | 3 | 1.1 | 1.4 | 1.2 |
| Ti—Zr/PET laminated | 3 | 3 | 3 | 1.4 | 1.4 | 1.4 |
| Cr(III)/PET laminated | 1-2 | 2 | 1-2 | 0.7 | 0.9 | 0.8 |
| Ti—Zr + p(VPA-AA)/PET laminated | 1 | 1 | 1 | 0.2 | 0.4 | 0.4 |
| Cr(III) + p(VPA-AA)/PET laminated | 1 | 1 | 1 | 0.3 | 0.2 | 0.2 |
| p(VPA-AA) (2.68%)/PET laminated | 1 | 1 | 1 | 0.2 | 0.2 | 0.1 |
| p(VPA-AA) (4.05%)/PET laminated | 1 | 1 | 1 | 0.2 | 0.1 | 0.2 |

Table 5 presents the cross-cut and feathering results after pasteurization. The cross-cut and feathering tests were performed on three samples across the width of the sheet 1000, in the left 1010, middle 1020, and right 1030 positions as shown in FIG. 10.

TABLE 5

Post-Pasteurization Feathering Results

| Sample Pre-Treatment/Coating | Cross-cut (1 mm) | | | Feathering (mm) | | |
|---|---|---|---|---|---|---|
| | Left | Middle | Right | Left | Middle | Right |
| Untreated/PET laminated | 4 | 3 | 3 | 3 | 2.3 | 3.5 |
| Ti—Zr/PET laminated | 4 | 5 | 5 | 4 | 6 | 3.2 |
| Cr(III)/PET laminated | 3 | 3 | 3 | 1 | 0.9 | 0.9 |
| Ti—Zr + p(VPA-AA)/PET laminated | 1 | 1 | 1 | 0.4 | 0.3 | 0.3 |
| Cr(III) + p(VPA-AA)/PET laminated | 3 | 3 | 3 | 0.8 | 0.8 | 0.8 |
| p(VPA-AA) (2.68%)/PET laminated | 1 | 1-2 | 1-2 | 0.2 | 0.2 | 0.2 |
| p(VPA-AA) (4.05%)/PET laminated | 1 | 1 | 1 | 0.2 | 0.2 | 0.2 |

Results of the various samples incorporating an adhesion promoter applied via roll coating are summarized in Tables 6-9. Table 6 shows the results of the resistance of the lamination to a citric acid immersion test. The cross-cut tests were performed on three samples across the width of the sheet 1000, in the left 1010, middle 1020, and right 1030 positions as shown in FIG. 10.

TABLE 6

Citric Acid Test

| Sample Pre-Treatment/Coating | Cross-Cut before (3 mm) | | | Cross-cut after (1 mm) | | |
|---|---|---|---|---|---|---|
| | Left | Middle | Right | Left | Middle | Right |
| Ti—Zr + p(VPA-AA) (0.27%)/PET laminated | No delamination | No delamination | No delamination | 1 | 1 | 1 |

TABLE 6-continued

Citric Acid Test

| Sample Pre-Treatment/Coating | Cross-Cut before (3 mm) | | | Cross-cut after (1 mm) | | |
|---|---|---|---|---|---|---|
| | Left | Middle | Right | Left | Middle | Right |
| Cr(III) + p(VPA-AA) (0.4%)/ PET laminated | No delamination | No delamination | No delamination | 1 | 1 | 1 |
| p(VPA-AA) (0.27%)/ PET laminated | No delamination | No delamination | No delamination | 1 | 1 | 1 |
| p(VPA-AA) (0.4%)/ PET laminated | No delamination | No delamination | No delamination | 1 | 1 | 1 |

Table 7 shows the results of the resistance of the lamination to an acetic acid immersion test. The adhesion promoter was applied via roll coating. The cross-cut tests were performed on three samples across the width of the sheet 1000, in the left 1010, middle 1020, and right 1030 positions as shown in FIG. 10.

TABLE 7

Acetic Test

| Sample Pre-Treatment/Coating | Cross-Cut before (3 mm) | | | Cross-cut after (1 mm) | | |
|---|---|---|---|---|---|---|
| | Left | Middle | Right | Left | Middle | Right |
| Ti—Zr + p(VPA-AA) (0.27%)/ PET laminated | No delamination | No delamination | No delamination | 1 | 1 | 1 |
| Cr(III) + p(VPA-AA) (0.4%)/ PET laminated | No delamination | No delamination | No delamination | 1 | 1 | 1 |
| p(VPA-AA) (0.27%)/ PET laminated | No delamination | No delamination | No delamination | 1 | 1 | 1 |
| p(VPA-AA) (0.4%)/ PET laminated | No delamination | No delamination | No delamination | 1 | 1 | 1 |

Table 8 shows the results of the resistance of the lamination to a pre-pasteurization feathering test. The adhesion promoter was applied via roll coating. The cross-cut and feathering tests were performed on three samples across the width of the sheet 1000, in the left 1010, middle 1020, and right 1030 positions as shown in FIG. 10.

TABLE 8

Pre-Pasteurization Feathering Test

| Sample Pre-Treatment/Coating | Cross-Cut (1 mm) | | | Feathering in mm | | |
|---|---|---|---|---|---|---|
| | Left | Middle | Right | Left | Middle | Right |
| Ti—Zr + p(VPA-AA) (0.27%)/PET laminated | 1 | 1 | 1 | 0.2 | 0.2 | 0.2 |
| Cr(III) + p(VPA-AA) (0.4%)/PET laminated | 1 | 1 | 1 | 0.2 | 0.3 | 0.3 |
| p(VPA-AA) (0.27%)/ PET laminated | 1 | 1 | 1 | 0.3 | 0.3 | 0.2 |
| p(VPA-AA) (0.4%)/ PET laminated | 1 | 1 | 1 | 0.2 | 0.2 | 0.2 |

Table 9 shows the results of the resistance of the lamination to a post-pasteurization feathering test. The adhesion promoter was applied via roll coating. The cross-cut and feathering tests were performed on three samples across the width of the sheet 1000, in the left 1010, middle 1020, and right 1030 positions as shown in FIG. 10.

TABLE 9

Post-Pasteurization Feathering Test

| Sample Pre-Treatment/Coating | Cross-Cut (1 mm) | | | Feathering in mm | | |
|---|---|---|---|---|---|---|
| | Left | Middle | Right | Left | Middle | Right |
| Ti—Zr + p(VPA-AA) (0.27%)/PET laminated | 1 | 1 | 1 | 0.3 | 0.3 | 0.2 |
| Cr(III) + p(VPA-AA) (0.4%)/PET laminated | 1 | 1-2 | 1 | 0.4 | 0.3 | 0.4 |
| p(VPA-AA) (0.27%)/ PET laminated | 1 | 1 | 1 | 0.4 | 0.2 | 0.2 |
| p(VPA-AA) (0.4%)/ PET laminated | 1 | 1 | 1 | 0.3 | 0.2 | 0.2 |

Tables 10-11 summarize results of various coating architectures exposed to various test conditions. All samples were ultimately laminated with a PET film. In the following examples, pre-lamination treatments included Cr(III); Ti—Zr; and p(VPA-AA). An aqueous p(VPA-AA) solution (e.g., prepared without ethanol) was applied with a commercial coater on a paint line. The samples were prepared on a commercial processing line, performing cleaning (e.g., degreasing), pretreating, and lamination in a single run.

Table 10 presents the results from a feathering test and a cross-cut test, before pasteurization. The cross-cut and feathering tests were performed on three samples across the width of the sheet 1000, in the left 1010, middle 1020, and right 1030 positions as shown in FIG. 10. Trials 1-3 of the Cr(III)/PET laminated samples were performed on three separate samples.

TABLE 10

Pre-Pasteurization Feathering Test

| Sample Pre-Treatment/ Coating | Cross-Cut (1 mm) | | | Feathering in mm | | |
|---|---|---|---|---|---|---|
| | Left | Middle | Right | Left | Middle | Right |
| Cr(III)/PET laminated - Trial 1 | 1-2 | 1-2 | 1-2 | 0.9 | 0.7 | 0.8 |
| Cr(III)/PET laminated - Trial 2 | 1-2 | 1-2 | 1-2 | 1.0 | 0.9 | 0.8 |
| Cr(III)/PET laminated - Trial 3 | 1 | 1 | 1 | 0.7 | 1.0 | 0.6 |
| Ti—Zr/PET laminated | 1 | 1 | 1 | 1 | 1.1 | 1 |
| p(VPA-AA) (0.6%)/PET laminated | 1 | 1 | 1 | 0.3 | 0.2 | 0.2 |
| p(VPA-AA) (0.6%)/PET laminated | 1 | 1 | 1 | 0.2 | 0.2 | 0.3 |

Table 11 presents the results from a feathering test and a cross-cut test, after pasteurization. The cross-cut and feathering tests were performed on three samples across the width of the sheet 1000, in the left 1010, middle 1020, and right 1030 positions as shown in FIG. 10. Trials 1-3 of the Cr(III)/PET laminated samples were performed on three separate samples.

TABLE 11

Post-Pasteurization Feathering Test

| Sample Pre-Treatment/ Coating | Cross-Cut (1 mm) | | | Feathering in mm | | |
|---|---|---|---|---|---|---|
| | Left | Middle | Right | Left | Middle | Right |
| Cr(III)/PET laminated - Trial 1 | 2 | 2 | 2 | 1.0 | 1.2 | 1.3 |
| Cr(III)/PET laminated - Trial 2 | 2 | 2 | 2 | 1.1 | 1.2 | 1.1 |
| Cr(III)/PET laminated - Trial 3 | 2 | 2 | 2 | 1.1 | 1.1 | 1 |
| Ti—Zr/PET laminated | 1 | 1 | 1 | 1.2 | 1.5 | 1.2 |
| p(VPA-AA) (0.6%)/PET laminated | 1 | 1 | 1 | 0.6 | 0.3 | 0.3 |
| p(VPA-AA) (0.6%)/PET laminated | 1 | 1 | 1 | 0.5 | 0.2 | 0.4 |

Tables 2 through 11 illustrate the positive effect of incorporating an adhesion promoter into the lamination architecture of an aluminum alloy metal strip. When the copolymer adhesion promoter was present, the samples exhibited highly favorable results in food simulant tests (e.g., acetic acid, citric acid), little to no delamination in cross-cut tests and significantly reduced feathering. Observed feathers were often one order of magnitude smaller than feathers observed in tested films without an adhesion promoter present. Surprisingly, incorporation of an adhesion promoter into metal strip lamination architecture provided improved adhesion of the polymer film to the metal strip, resulting in feathering reduced well beyond industry accepted limits.

Example 3

Figure 11:
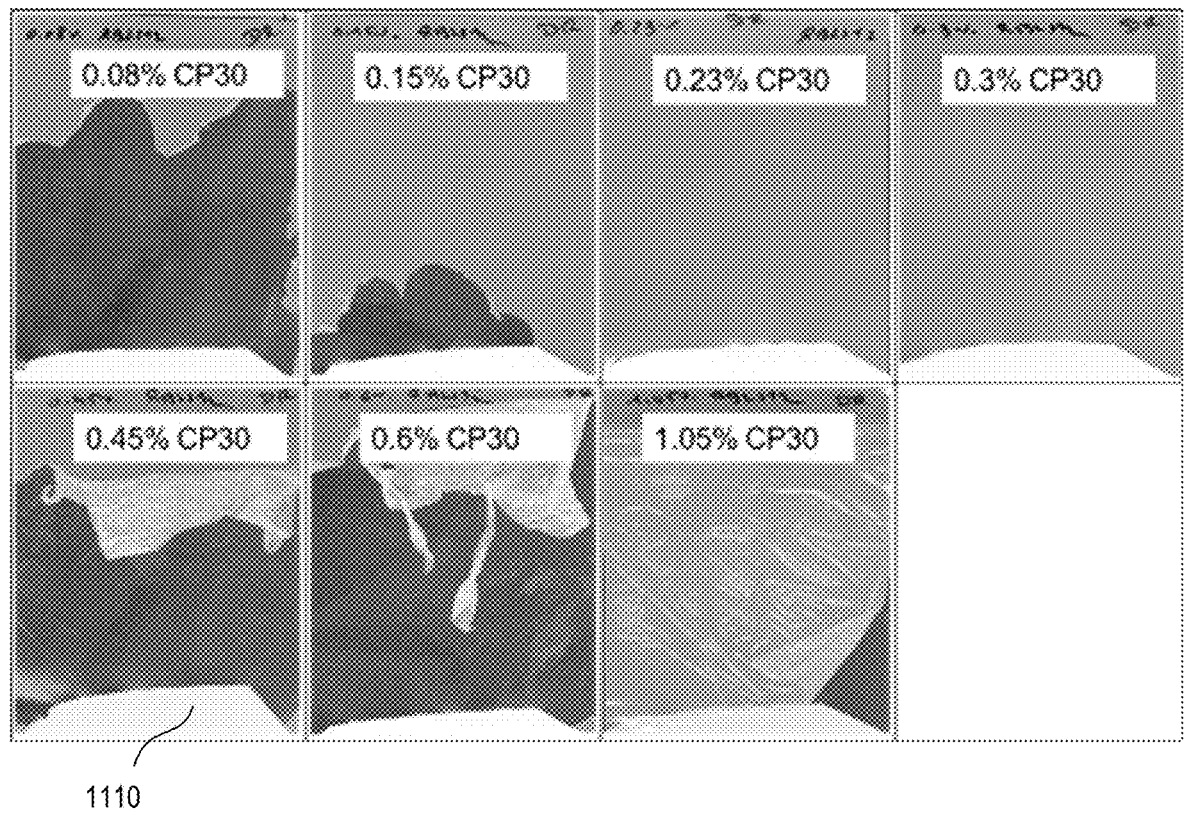
FIG. 11 is a panel containing digital images depicting delamination of a PET film due to water sensibility.

FIG. 11 shows the results of various coating architectures exposed to aqueous environments. All samples were ultimately laminated with a PET film. In the following examples, pre-lamination treatments included a commercially available poly(vinyl phosphonic acid-co-acrylic acid) (p(VPA-AA)) adhesion promoter in various concentrations in ethanol (EtOH). The p(VPA-AA) adhesion promoter was coated via roll coating, the parameters of which are set forth above. Not to be bound by theory, a film laminated onto a can end can exhibit a water sensibility during and after opening the can. For example, a small area of feathered film can allow water (e.g., liquid water stored in the can or water vapor present in the can) to propagate between the metal of the can end and the laminated film. Such water ingress can significantly delaminate the laminated film. In some cases, delamination can be accelerated by carbonated liquids and/or pressurized liquids.

As demonstrated herein, water sensibility can be controlled by controlling the coating weight of the p(VPA-AA) adhesion promoter. FIG. 11 contains digital images showing the effects of p(VPA-AA) adhesion promoter coating weight on adhesion of the laminated film during aqueous environment testing. A metal strip was pretreated and laminated as described above. Samples were cut from the metal strip (e.g., before forming a can end) to a 10 cm by 21 cm coupon. The coupons were placed in non-carbonated water for 10 minutes. The coupons were cut at two different locations to allow testing in a direction transverse to the rolling direction of the metal strip, and in a same direction as the rolling direction of the metal strip (e.g., a direction longitudinal to the rolling direction of the metal strip). The cut samples were immersed in water. A portion 1110 of the metal strip that was loosened when the metal strip was cut was bent in a direction away from the laminated side of the metal strip. As shown in FIG. 11, an optimal coating weight exists for the p(VPA-AA) adhesion promoter under the test conditions. In the example of FIG. 11, the coating weight achieved by applying the p(VPA-AA) adhesion promoter from an aqueous solution containing up to about 0.45 wt. % p(VPA-AA) adhesion promoter provided optimal adhesion. Accordingly, applying greater than about 0.45 wt. % of the p(VPA-AA) adhesion promoter adversely affected adhesion, and allowed the laminated film to delaminate.

Tables 12-15 summarize the results of aqueous environment testing performed on formed can ends. A metal strip was pretreated and laminated as described above, and formed into beverage can ends. Aqueous environment testing was performed by filling a can body with chilled carbonated water (8° C.), seaming the can body with a beverage can end, and storing the can upside down (e.g., the laminated can end was at the bottom) in an oven at 38° C. for 10 minutes. After storing the can in the oven, the can was opened very slowly while still upside down to provide a slight opening such that pressure and a portion of the liquid were released. After releasing the pressure, the can was emptied by cutting the can body and removing the can end from the can body. The laminated film was then analyzed. Any visible delamination was indicated as a failure. No visible delamination was indicated as a pass. The effects of storage time, temperature, and liquid (e.g., water) exposure were evaluated. Results of the various samples incorporating an adhesion promoter and stored for various times at various temperatures are summarized in Table 12.

TABLE 12

Effects of Storage Time and Temperature

| Temp | Time | | | | | |
|---|---|---|---|---|---|---|
| | 5 min. | 15 min. | 30 min. | 60 min. | 120 min. | 240 min. |
| 80° C. | Fail | Fail | Fail | Fail | N/A | N/A |
| 100° C. | Fail | Fail | Fail | Fail | N/A | N/A |
| 120° C. | Fail | Fail | Fail | Fail | Fail | Fail |
| 140° C. | Fail | Fail | Fail | Fail | N/A | N/A |

As shown in Table 12, heating the laminated films and maintaining an elevated temperature in a dry environment does not alleviate water sensibility. Tables 13-15 below demonstrate the effects on the water sensibility caused by exposing the laminated films to an aqueous environment at various temperatures and for various times.

Results of the various samples incorporating an adhesion promoter and exposed to demineralized water for various times at various temperatures are summarized in Table 13.

TABLE 13

Effects of Water Exposure at Various Times and Temperatures

| Temp. | Time | | | |
|---|---|---|---|---|
| | 5 min. | 15 min. | 30 min. | 60 min. |
| 30° C. | Fail | Fail | Fail | Fail |
| 40° C. | Fail | Fail | Fail | Fail |
| 50° C. | Fail | Fail | Fail | Fail |
| 60° C. | Fail | Fail | Pass | Pass |
| 80° C. | Fail | Pass | Pass | Pass |
| 100° C. | Pass | Pass | Pass | Pass |

As shown in Table 13, water sensibility can be eliminated by exposing the laminated film to water at an elevated temperature (e.g., at least about 60° C.) for various times (e.g., up to about one hour).

Results of the various samples incorporating an adhesion promoter and exposed to deionized water for various times at various temperatures are summarized in Table 14. The cans including the laminated films were immersed in deionized water by storing the cans upside down.

TABLE 14

Effects of Time, Temperature, and Water Immersion

| | Time (hours) | | | | | | | |
|---|---|---|---|---|---|---|---|---|
| | 2 | 4 | 6 | 9 | 24 | 48 | 72 | 120 |
| 25° C. | Fail | Fail | Fail | Fail | Pass | Pass | Pass | Pass |
| 8° C. | Fail | Fail | Fail | Fail | Pass | Pass | Pass | Pass |

As shown in Table 14, water sensibility can be eliminated for liquid filled cans stored upside down (e.g., having the laminated can end at the bottom) for at least 24 hours at room temperature or in a refrigerator (e.g., about 8° C.).

Results of the various samples incorporating an adhesion promoter and exposed to deionized water (e.g., the laminated films were subjected to a high-humidity deionized water environment by storing the cans right-side up) for various times at various temperatures are summarized in Table 15.

TABLE 15

Effects of Time, Temperature, and Water Vapor Exposure

| | Time (hours) | | | | | | | |
|---|---|---|---|---|---|---|---|---|
| | 2 | 4 | 6 | 9 | 24 | 48 | 72 | 120 |
| 25° C. | Fail | Fail | Fail | Fail | Pass | Pass | Pass | Pass |
| 8° C. | Fail | Fail | Fail | Fail | Fail | Fail | Pass | Pass |

As shown in Table 15, water sensibility can be eliminated for liquid filled cans stored right-side up (e.g., having the laminated can end at the top) for at least 24 hours at room temperature, or at least 72 hours in a refrigerator (e.g., about 8° C.).

The use of an adhesion promoter when preparing a laminated metal strip can provide unexpected benefits, including improved feathering performance. In some examples, the adhesion promoter can improve adhesion of a polymer film to a metal strip beyond acceptable limits. Additionally, the combined use of a conversion layer and an adhesion promoter when preparing a laminated metal strip can provide unexpected benefits, including improved feathering performance. In some examples, use of an adhesion promoter when preparing a laminated metal strip can provide negligible feathering of an amorphous polymer film applied to a metal strip. Additionally, exposing the amorphous polymer film to an aqueous environment before opening a laminated scored orifice (e.g., a can end opening) can eliminate delamination caused by water separating the amorphous polymer film from the metal.

ILLUSTRATIONS

Illustration 1 is a process for preparing can end stock, comprising: applying a copolymer adhesion promoter solution to a first side of a metal strip; drying the copolymer adhesion promoter solution to provide a copolymer adhesion promoter film on the first side of the metal strip; curing the copolymer adhesion promoter film on the first side of the metal strip; laminating a polymer film to the copolymer adhesion promoter film on the first side of the metal strip to produce a laminated metal strip; and annealing the laminated metal strip at an annealing temperature.

Illustration 2 is the process of any preceding or subsequent illustration, wherein the metal strip is an aluminum strip.

Illustration 3 is the process of any preceding or subsequent illustration, wherein the aluminum strip is a 1xxx, 2xxx, 3xxx, 4xxx, 5xxx, 6xxx, 7xxx, and 8xxx series aluminum alloy.

Illustration 4 is the process of any preceding or subsequent illustration, wherein the copolymer adhesion promoter solution is a solution containing a vinyl phosphonic acid-acrylic acid copolymer.

Illustration 5 is the process of any preceding or subsequent illustration, wherein the polymer film comprises a polyester film.

Illustration 6 is the process of any preceding or subsequent illustration, wherein the polyester film comprises a polyethylene terephthalate (PET) film.

Illustration 7 is the process of any preceding or subsequent illustration, wherein applying the copolymer adhesion promoter solution comprises bar coating, roller coating, spray coating, or dip coating.

Illustration 8 is the process of any preceding or subsequent illustration, wherein the copolymer adhesion promoter solution is an aqueous copolymer adhesion promoter solution.

Illustration 9 is the process of any preceding or subsequent illustration, wherein the aqueous copolymer adhesion promoter solution comprises 0.08 wt. % to 0.45 wt. % copolymer adhesion promoter based on the weight of the aqueous copolymer adhesion promoter solution.

Illustration 10 is the process of any preceding or subsequent illustration, wherein the aqueous copolymer adhesion promoter solution comprises 0.2 wt. % to 0.32 wt. % copolymer adhesion promoter based on the weight of the aqueous copolymer adhesion promoter solution.

Illustration 11 is the process of any preceding or subsequent illustration, wherein drying is performed for up to 30 seconds.

Illustration 12 is the process of any preceding or subsequent illustration, wherein laminating the polymer film includes laminating a polyethylene terephthalate film to the metal strip.

Illustration 13 is the process of any preceding or subsequent illustration, further comprising cleaning the metal strip, wherein cleaning the metal strip includes removing native oxide and/or hydroxide species from a surface of the metal strip; applying a conversion layer; and curing the conversion layer.

Illustration 14 is the process of any preceding or subsequent illustration, wherein cleaning the metal strip includes immersing the metal strip in a mixture of sulfuric and hydrofluoric acid.

Illustration 15 is the process of any preceding or subsequent illustration, wherein the conversion layer comprises compounds of chromium III phosphate or titanium/zirconium.

Illustration 16 is the process of any preceding or subsequent illustration, wherein laminating the polymer film comprises heating a temperature of the polymer film to at least 200° C., contacting the polymer film with the copolymer adhesion promoter film on the first side of the metal strip; and maintaining the temperature of the polymer film at a temperature of at least 200° C. for from 1 second to 30 seconds.

Illustration 17 is the process of any preceding or subsequent illustration, further comprising applying a layer of lacquer or another polymer film to a second side of the metal strip, wherein the first side of the metal strip corresponds to an interior-facing side of a can end formed from the metal strip, and wherein the second side of the metal strip corresponds to an exterior-facing side of a can end formed from the metal strip.

Illustration 18 is the process of any preceding or subsequent illustration, wherein annealing the laminated metal strip includes raising a temperature of the polymer film for a duration sufficient to melt the polymer film into a surface texture of the metal strip.

Illustration 19 is the process of any preceding or subsequent illustration, wherein annealing the laminated metal strip includes raising the temperature of the polymer film to at least 230° C.

Illustration 20 is the process of any preceding or subsequent illustration, wherein the polymer film comprises at least one polyamide.

Illustration 21 is the process of any preceding or subsequent illustration, wherein the at least one polyamide comprises nylon 12.

Illustration 22 is a can end stock product according to any preceding or subsequent illustration, comprising a metal strip comprising a first side and a second side, wherein at least the first side comprises an adhesion promoter layer, and a polymer film layer coupled to the adhesion promoter layer.

Illustration 23 is the can end stock product of any preceding or subsequent illustration, wherein the first side further comprises a conversion layer arranged opposite the adhesion promoter layer from the polymer film layer, wherein the second side comprises at least one of a lacquer layer or a polymer layer.

Illustration 24 is the can end stock product of any preceding or subsequent illustration, wherein the can end stock product comprises a scored orifice openable to form a can end opening.

Illustration 25 is the can end product of any preceding illustration, wherein the can end opening is devoid of visible feathered portions of the polymer film layer upon opening the orifice.

All patents, publications, and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A process for preparing can end stock, comprising:
   cleaning a metal strip, wherein cleaning the metal strip includes removing or reducing native oxide or hydroxide species from a first side of the metal strip so that a remaining metal oxide or hydroxide layer, if present, is 1 nm thick or less;
   applying a copolymer adhesion promoter solution to the first side of the metal strip having the remaining metal oxide or hydroxide layer, if present, thereon, wherein the copolymer adhesion promoter solution comprises a vinyl phosphonic acid-acrylic acid copolymer;
   drying the copolymer adhesion promoter solution to provide a copolymer adhesion promoter film on the first side of the metal strip;
   curing the copolymer adhesion promoter film on the first side of the metal strip;
   laminating a polymer film to the copolymer adhesion promoter film on the first side of the metal strip to produce a laminated metal strip; and
   annealing the laminated metal strip at an annealing temperature.

2. The process of claim 1, wherein the metal strip is a 1xxx, 2xxx, 3xxx, 4xxx, 5xxx, 6xxx, 7xxx, or 8xxx series aluminum alloy.

3. The process of claim 1, wherein the polymer film comprises a polyester film.

4. The process of claim 3, wherein the polymer film comprises a polyethylene terephthalate (PET) film.

5. The process of claim 1, wherein applying the copolymer adhesion promoter solution comprises bar coating, roller coating, spray coating, or dip coating.

6. The process of claim 1, wherein the copolymer adhesion promoter solution is an aqueous copolymer adhesion promoter solution.

7. The process of claim 1, wherein drying the copolymer adhesion promoter solution is performed for up to 30 seconds.

8. The process of claim 1, further comprising:
applying a conversion layer before applying the copolymer adhesion promoter solution; and
curing the conversion layer.

9. The process of claim 8, wherein the conversion layer comprises compounds of chromium III phosphate or titanium/zirconium.

10. The process of claim 1, wherein cleaning the metal strip comprises immersing the metal strip in a mixture of sulfuric acid and hydrofluoric acid.

11. The process of claim 1, wherein laminating the polymer film comprises:
heating a temperature of the polymer film to at least 200° C.;
contacting the polymer film with the copolymer adhesion promoter film on the first side of the metal strip; and
maintaining the temperature of the polymer film for from 1 second to 30 seconds.

12. The process of claim 1, wherein annealing the laminated metal strip includes raising a temperature of the polymer film to at least 230° C.

13. The process of claim 1, further comprising applying a layer of lacquer or another polymer film to a second side of the metal strip, wherein the first side of the metal strip corresponds to an interior-facing side of a can end formed from the metal strip, and wherein the second side of the metal strip corresponds to an exterior-facing side of a can end formed from the metal strip.

14. The process of claim 1, wherein the applying step comprises depositing the copolymer adhesion promoter solution, wherein the copolymer adhesion promoter solution comprises an aqueous solution containing an adhesion promoter from 0.08 wt. % to 0.45 wt. %.

15. A process for preparing can end stock, comprising:
cleaning a metal strip, wherein cleaning the metal strip includes removing or reducing native oxide or hydroxide species from a first side of the metal strip so that a remaining metal oxide or hydroxide layer, if present, is 1 nm thick or less;
applying a copolymer adhesion promoter solution to the first side of the metal strip having the remaining metal oxide or hydroxide layer, if present, thereon, wherein the copolymer adhesion promoter solution comprises a vinyl phosphonic acid-acrylic acid copolymer;
drying the copolymer adhesion promoter solution to provide a copolymer adhesion promoter film on the first side of the metal strip;
laminating a polymer film to the copolymer adhesion promoter film on the first side of the metal strip to produce a laminated metal strip; and
annealing the laminated metal strip at an annealing temperature.

* * * * *

UNITED STATES PATENT AND TRADEMARK OFFICE
CERTIFICATE OF CORRECTION

| | | |
|---|---|---|
| PATENT NO. | : 11,826,985 B2 | Page 1 of 1 |
| APPLICATION NO. | : 16/723024 | |
| DATED | : November 28, 2023 | |
| INVENTOR(S) | : Spahn et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 660 days.

Signed and Sealed this
Eighth Day of July, 2025

Coke Morgan Stewart
*Acting Director of the United States Patent and Trademark Office*